United States Patent
Furukawa et al.

(10) Patent No.: US 7,930,439 B2
(45) Date of Patent: Apr. 19, 2011

(54) COMMAND OUTPUT CONTROL APPARATUS

(75) Inventors: Kazuya Furukawa, Osaka (JP);
Masayuki Masumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 12/294,338

(22) PCT Filed: Feb. 20, 2007

(86) PCT No.: PCT/JP2007/053021
§ 371 (c)(1),
(2), (4) Date: Sep. 24, 2008

(87) PCT Pub. No.: WO2007/116612
PCT Pub. Date: Oct. 18, 2007

(65) Prior Publication Data
US 2009/0287850 A1    Nov. 19, 2009

(30) Foreign Application Priority Data
Mar. 31, 2006    (JP) .................................. 2006-096272

(51) Int. Cl.
*G06F 3/00* (2006.01)
*G06F 13/00* (2006.01)
(52) U.S. Cl. ...................... 710/5; 710/6; 710/15; 710/29
(58) Field of Classification Search .................. None
See application file for complete search history.

(56) References Cited

U.S. PATENT DOCUMENTS
6,246,422 B1    6/2001    Emberling et al.
6,819,326 B2    11/2004    Jaspers
(Continued)

FOREIGN PATENT DOCUMENTS
EP        0814428 A2    12/1997
(Continued)

OTHER PUBLICATIONS

Kim, Chang Soo, Design and Implementation of a Storage Management Method for Content Distribution, Feb. 22, 2006, ieeexplore.ieee.org [accessed online on Nov. 23, 2010], URL: http://ieeexplore.ieee.org/stamp/stamp.jsp?tp=&arnumber=1625778.*

(Continued)

*Primary Examiner* — Tariq Hafiz
*Assistant Examiner* — Scott Sun
(74) *Attorney, Agent, or Firm* — Greenblum & Bernstein, P.L.C.

(57) ABSTRACT

In a command output control apparatus, one of first and second storage areas that corresponds to the smaller number of subcommands is selected as a storage area subjected to division, according to a comparison result by a subcommand number comparison unit. From partial storage areas constituting the storage area subjected to the division, a partial storage area no smaller than a predetermined size is selected as a partial storage area subjected to the division, according to a comparison result by a size comparison unit. Subcommands for accessing partial storage areas obtained by dividing the partial storage area subjected to the division are generated by an access area division unit. A subcommand for accessing the partial storage area subjected to the division is replaced with the generated subcommands. Subcommands are alternately selected from first and second subcommand groups after the replacement and outputted to a memory.

8 Claims, 24 Drawing Sheets

U.S. PATENT DOCUMENTS

2002/0135589 A1     9/2002    Jaspers
2006/0259662 A1    11/2006    Furukawa et al.
2007/0030751 A1*    2/2007    Dortu et al. .............. 365/230.03
2008/0140724 A1*    6/2008    Flynn et al. ................ 707/104.1

FOREIGN PATENT DOCUMENTS

| | | |
|---|---|---|
| JP | 10-143426 A | 5/1998 |
| JP | 2001-256106 A | 9/2001 |
| JP | 2004-518343 A | 6/2004 |
| WO | 00/13088 | 3/2000 |
| WO | 2000/033194 A1 | 6/2000 |
| WO | 02/056600 A1 | 7/2002 |
| WO | 2005/109205 A1 | 11/2005 |

OTHER PUBLICATIONS

English language Abstract of JP 2001-256106 A.

English language Abstract of JP 10-143426 A.

Kim H et al., "Array Address Translation for SDRAM-Based Video Processing Applications", Proceedings of the SPIE, SPIE, Bellingham, VA, US, vol. Part 01-03, No. 4067, Jun. 20, 2000, pp. 922-931.

* cited by examiner

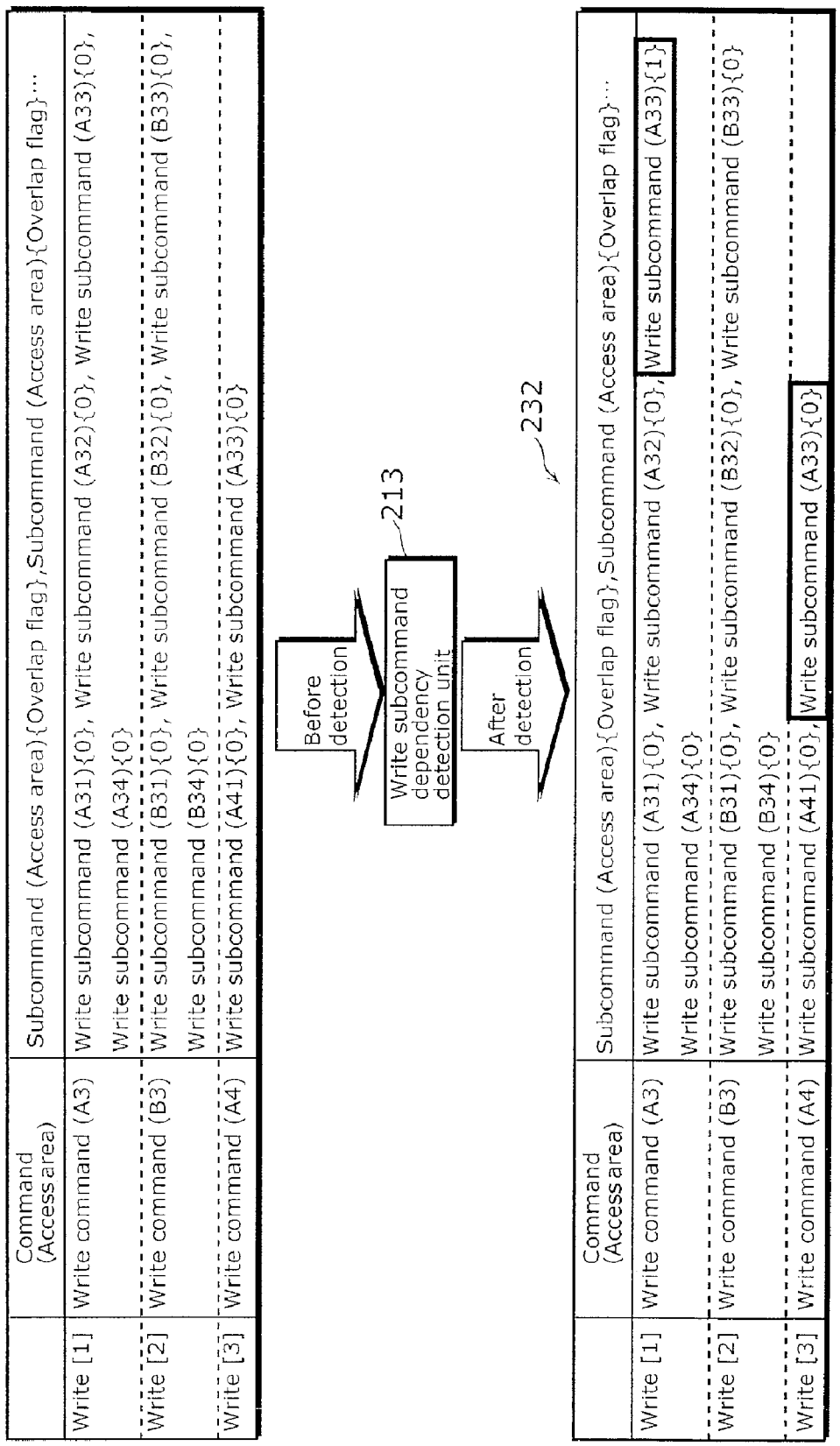

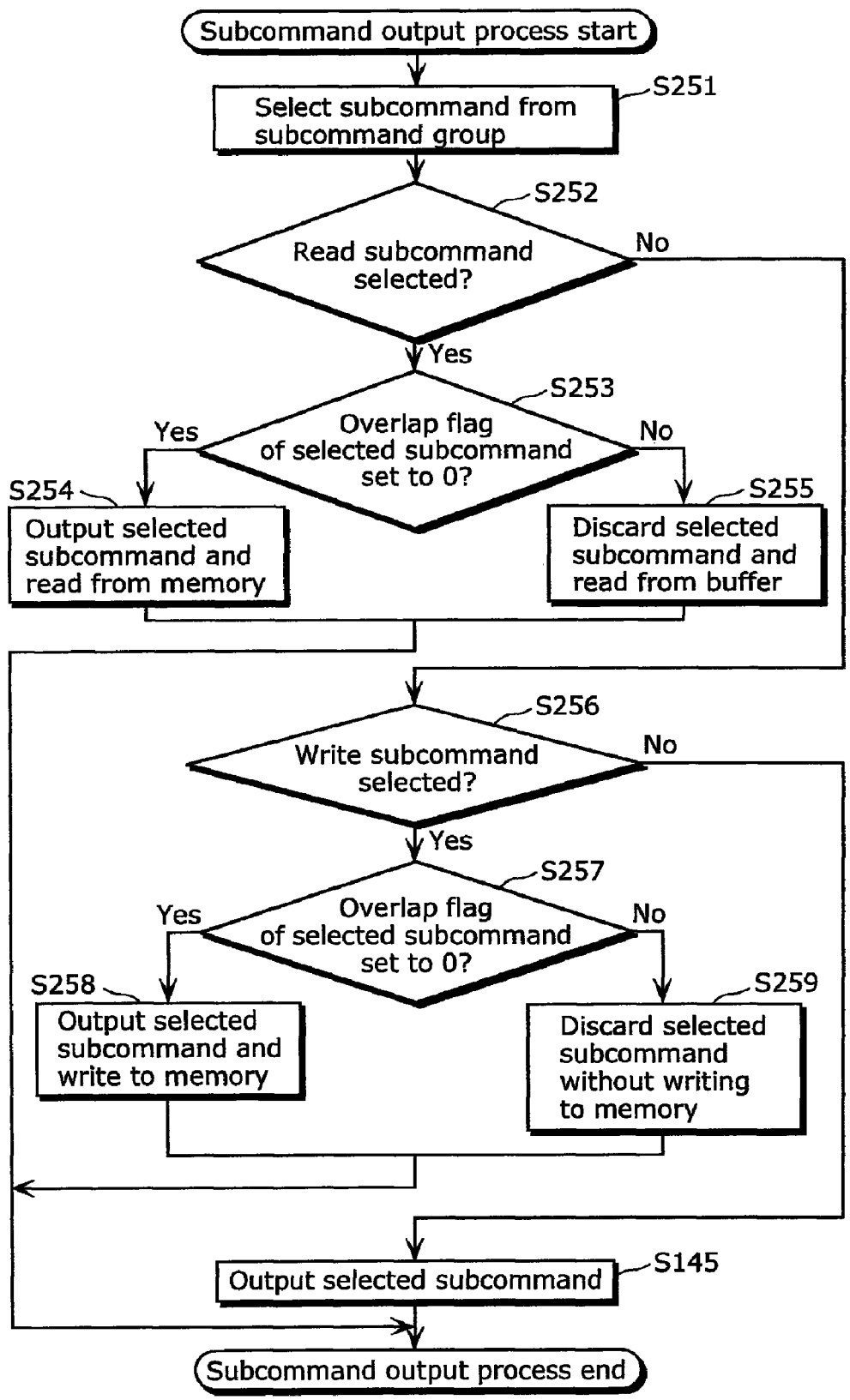

COMMAND OUTPUT CONTROL APPARATUS

TECHNICAL FIELD

The present invention relates to a command output control apparatus and the like that control output of commands for accessing a memory, and especially relates to a command output control apparatus and the like that control output of commands used for read/write.

BACKGROUND ART

Conventionally, various techniques have been proposed for efficiently accessing a memory such as an SDRAM. As one example of these techniques, a technique of alternately accessing banks by utilizing SDRAM bank access characteristics to thereby conceal overhead between commands has been proposed (for example, see Patent References 1 and 2).

Efficient access is also required in the case where data mapped on a memory is accessed in units of rectangular areas by commands including a plurality of row addresses, as in image processing of recent years.

Patent Reference 1: Japanese Unexamined Patent Application Publication No. 2001-256106
Patent Reference 2: U.S. Pat. No. 6,819,326

DISCLOSURE OF INVENTION

Problems that Invention is to Solve

However, since the conventional techniques are not intended for access which is performed in units of rectangular areas, commands including a plurality of row addresses cannot be processed. Besides, when a storage area to be accessed by a command is divided into a plurality of partial storage areas, a size of a partial storage area may become too small to conceal overhead.

The present invention has been developed in view of the above problems, and has an object of providing a command output control apparatus that can improve efficiency when data mapped on a memory is accessed in units of rectangular areas.

Means to Solve the Problems

To achieve the stated object, a command output control apparatus according to the present invention is (a) a command output control apparatus including: (a1) a subcommand holding unit that holds a first subcommand group and a second subcommand group, the first subcommand group being generated from a command for accessing a first storage area, and the second subcommand group being generated from a command for accessing a second storage area included in a bank different from the first storage area; (a2) a number comparison unit that compares the number of subcommands included in the first subcommand group and the number of subcommands included in the second subcommand group; (a3) a storage area selection unit that selects, according to a result of the comparison by the number comparison unit, one of the first storage area and the second storage area corresponding to the smaller number of subcommands, as a storage area that is subjected to division; (a4) a size comparison unit that compares sizes of partial storage areas to be accessed by subcommands included in a subcommand group with the smaller number of subcommands; (a5) a partial storage area selection unit that selects, according to a result of the comparison by the size comparison unit, a partial storage area no smaller than a predetermined size from partial storage areas constituting the storage area that is subjected to the division, as a partial storage area that is subjected to the division; (a6) a subcommand generation unit that generates subcommands respectively for accessing partial storage areas obtained by dividing the partial storage area that is subjected to the division; (a7) a subcommand replacement unit that replaces a subcommand for accessing the partial storage area that is subjected to the division among subcommands held in the subcommand holding unit, with the subcommands generated by the subcommand generation unit; and (a8) a subcommand output unit that outputs subcommands alternately from the first subcommand group and the second subcommand group, to a memory.

According to this structure, when data mapped on a memory is accessed in units of rectangular areas by commands including a plurality of row addresses, the numbers of subcommands are made equal and these subcommands are outputted alternately. Thus, access can be performed efficiently by switching between banks. In addition, a partial storage area no smaller than a predetermined size is selected as a partial storage area that is subjected to division. This being so, by setting the predetermined size to be such a size that allows overhead to be concealed, the situation where a size of a partial storage area becomes too small to conceal overhead can be prevented.

Moreover, (b) the command output control apparatus may further include (b1) a size specification unit that specifies sizes of partial storage areas to be accessed by subcommands, wherein (b2) the subcommand output unit outputs, among subcommands held in the subcommand holding unit, a subcommand for accessing a partial storage area smaller than the predetermined size subsequent to a subcommand for accessing a partial storage area no smaller than the predetermined size, according to a result of the specification by the size specification unit.

According to this structure, the situation where the generation of a subcommand for accessing a partial storage area of a small size causes overhead can be prevented.

Moreover, (c) the command output control apparatus may further include (c1) a subcommand type detection unit that detects subcommands of a same type that have no dependency with a subcommand of another type, from subcommands held in the subcommand holding unit, wherein (c2) the subcommand output unit consecutively outputs the subcommands of the same type detected by the subcommand type detection unit.

According to this structure, the possibility that overhead occurs between a read subcommand and a write subcommand can be reduced.

Moreover, (d) the command output control apparatus may further include (d1) a write subcommand dependency detection unit that detects write subcommands for accessing a same partial storage area, from subcommands held in the subcommand holding unit, wherein (d2) the subcommand output unit discards a write subcommand that is in an earlier position in an output order of the write subcommands and outputs a write subcommand that is in a later position in the output order of the write subcommands, according to a result of the detection by the write subcommand dependency detection unit.

According to this structure, an overlapping write subcommand can be omitted, with it being possible to improve access efficiency.

Moreover, (e) the command output control apparatus may further include (e1) a read subcommand dependency detection unit that detects read subcommands for accessing a same partial storage area, from subcommands held in the subcommand holding unit, wherein (e2) the subcommand output unit outputs a read subcommand that is in an earlier position in an output order of the read subcommands and discards a read subcommand that is in a later position in the output order of the read subcommands, according to a result of the detection by the read subcommand dependency detection unit.

Moreover, (f) the command output control apparatus may further include (f1) a buffer that temporarily holds data read from the memory, wherein (f2) the subcommand output unit temporarily stores, in the buffer, data read from the memory when the read subcommand that is in the earlier position in the output order is outputted, and reads the data from the buffer at an output timing of the read subcommand that is in the later position in the output order.

According to this structure, an overlapping read subcommand can be omitted, with it being possible to improve access efficiency.

Moreover, (g) the command output control apparatus may further include: (g1) an address comparison unit that compares addresses of partial storage areas to be accessed by subcommands in each of the subcommand groups; and (g2) a subcommand selection unit that selects, from subcommands held in the subcommand holding unit, a subcommand for accessing a partial storage area that has a smaller displacement from an address of a partial storage area accessed by a subcommand outputted earlier, according to a result of the comparison by the address comparison unit, wherein (g3) the subcommand output unit outputs the subcommand selected by the subcommand selection unit.

According to this structure, power consumption of an address bus can be lowered without a decrease in access efficiency.

It should be noted that the present invention can be realized not only as a command output control apparatus, but also as a command output control method for controlling the command output control apparatus, a Large Scale Integration (LSI) including the functions of the command output control apparatus, an Intellectual Property (IP) core for implementing these functions on a programmable logic device such as a Field Programmable Gate Array (FPGA) or a Complex Programmable Logic Device (CPLD), a recording medium on which the IP core is recorded, and the like.

EFFECTS OF THE INVENTION

According to the present invention, when data mapped on a memory is accessed in units of rectangular areas by commands including a plurality of row addresses, the numbers of subcommands are made equal and these subcommands are outputted alternately. Thus, access can be performed efficiently by switching between banks.

In addition, a partial storage area no smaller than a predetermined size is selected as a partial storage area that is subjected to division. This being so, by setting the predetermined size to be such a size that allows overhead to be concealed, the situation where a size of a partial storage area becomes too small to conceal overhead can be prevented. Besides, the situation where the generation of a subcommand for accessing a partial storage area of a small size causes overhead can be prevented.

Moreover, the possibility that overhead occurs between a read subcommand and a write subcommand can be reduced. Additionally, an overlapping write subcommand or read subcommand can be omitted, with it being possible to improve access efficiency.

Furthermore, power consumption of an address bus can be lowered by reducing an address displacement, without a decrease in access efficiency.

BRIEF DESCRIPTION OF DRAWINGS

FIG. 17 shows a process in which a dependency is detected by a write subcommand dependency detection unit in the second embodiment of the present invention.

FIG. 24 shows a subcommand output process performed in the command output control apparatus in the second embodiment of the present invention.

NUMERICAL REFERENCES

Figure 1:
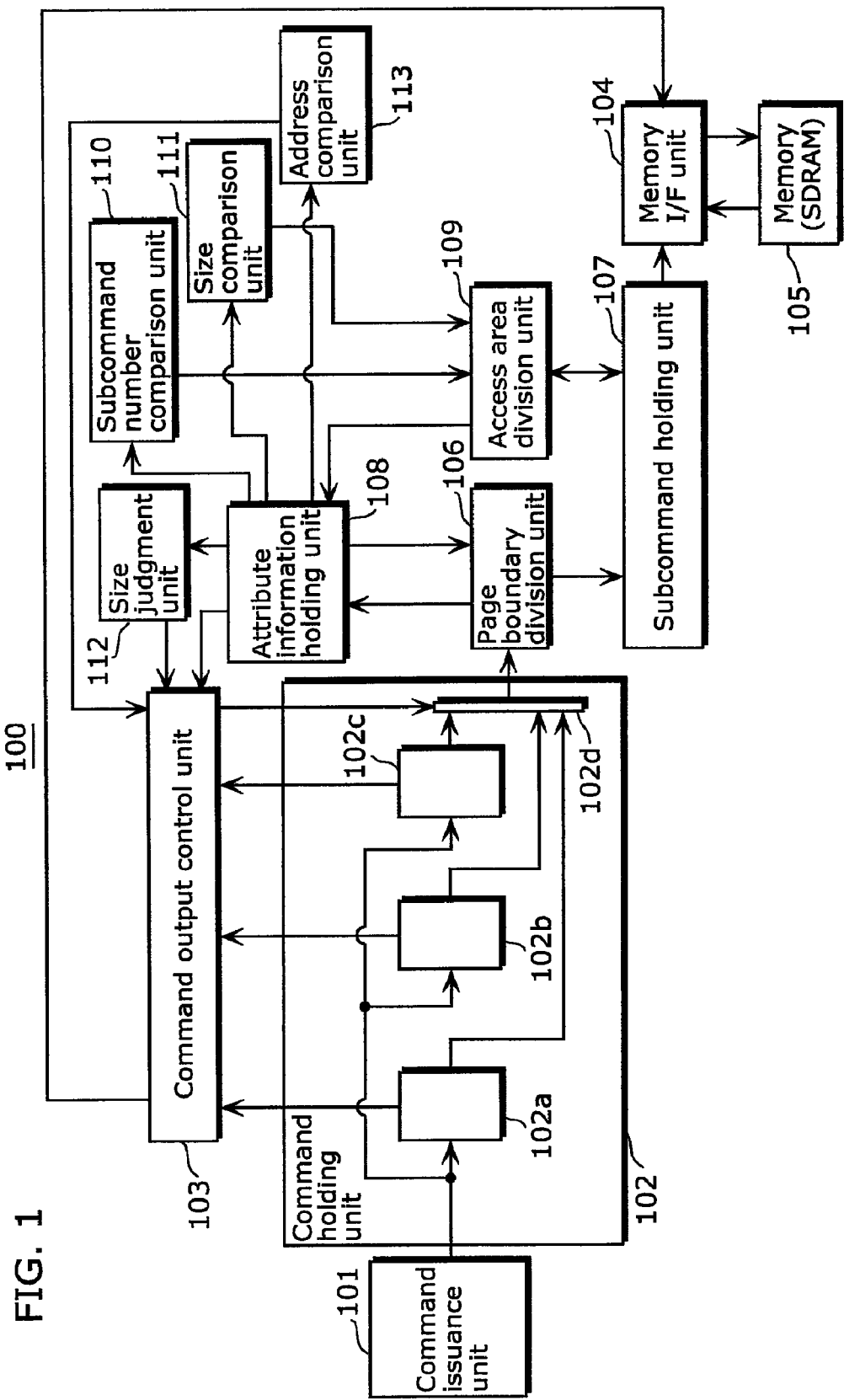
FIG. 1 shows a structure of a command output control apparatus in a first embodiment of the present invention.

100 Command output control apparatus
101 Command issuance unit
102 Command holding unit
102a to 102c Register
102d Selector
103 Command output control unit
104 Memory I/F unit
105 Memory
106 Page boundary division unit
107 Subcommand holding unit
108 Attribute information holding unit
109 Access area division unit
110 Subcommand number comparison unit
111 Size comparison unit
112 Size judgment unit
113 Address comparison unit
200 Command output control apparatus
203 Command output control unit
204 Memory I/F unit
208 Attribute information holding unit
212 Read/write attribute judgment unit
213 Write subcommand dependency detection unit
214 Read subcommand dependency detection unit
215 Buffer

BEST MODE FOR CARRYING OUT THE INVENTION

First Embodiment

A first embodiment of the present invention is described below, with reference to drawings.

A command output control apparatus in this embodiment has the following features (a) to (c).

(a) The command output control apparatus includes: (a1) a subcommand holding function that holds a first subcommand group and a second subcommand group, the first subcommand group being generated from a command for accessing a first storage area, and the second subcommand group being generated from a command for accessing a second storage area included in a bank different from the first storage area; (a2) a number comparison function that compares the number of subcommands included in the first subcommand group and the number of subcommands included in the second subcommand group; (a3) a storage area selection function that selects, according to a result of the comparison by the number comparison function, one of the first storage area and the second storage area corresponding to the smaller number of subcommands, as a storage area that is subjected to division; (a4) a size comparison function that compares sizes of partial storage areas to be accessed by subcommands included in a subcommand group with the smaller number of subcommands; (a5) a partial storage area selection function that selects, according to a result of the comparison by the size comparison function, a partial storage area no smaller than a predetermined size from partial storage areas constituting the storage area that is subjected to the division, as a partial storage area that is subjected to the division; (a6) a subcommand generation function that generates subcommands respectively for accessing partial storage areas obtained by dividing the partial storage area that is subjected to the division; (a7) a subcommand replacement function that replaces a subcommand for accessing the partial storage area that is subjected to the division among subcommands held in the subcommand holding function, with the subcommands generated by the subcommand generation function; and (a8) a subcommand output function that outputs subcommands alternately from the first subcommand group and the second subcommand group, to a memory.

(b) The command output control apparatus further includes a size specification function that specifies sizes of partial storage areas to be accessed by subcommands, wherein the subcommand output function outputs, among subcommands held in the subcommand holding function, a subcommand for accessing a partial storage area smaller than the predetermined size subsequent to a subcommand for accessing a partial storage area no smaller than the predetermined size, according to a result of the specification by the size specification function.

(c) The command output control apparatus further includes: (c1) an address comparison function that compares addresses of partial storage areas to be accessed by subcommands in each of the subcommand groups; and (c2) a subcommand selection function that selects, from subcommands held in the subcommand holding function, a subcommand for accessing a partial storage area that has a smaller displacement from an address of a partial storage area accessed by a subcommand outputted earlier, according to a result of the comparison by the address comparison function, wherein (c3) the subcommand output function outputs the subcommand selected by the subcommand selection function.

In view of the above, the command output control apparatus in this embodiment is described below. In the following description, a storage area fragment obtained by dividing a storage area to be accessed by a command is referred to as a partial storage area. A command generated for each partial storage area is referred to as a subcommand. A collection of subcommands is referred to as a subcommand group. A partial storage area fragment obtained by dividing a partial storage area to be accessed by a subcommand is referred to as a partial storage area, too. A storage area to be accessed by a command and a partial storage area to be accessed by a subcommand are each referred to as an access area.

The following describes a structure of the command output control apparatus in this embodiment.

FIG. 1 shows the structure of the command output control apparatus in this embodiment. As shown in FIG. 1, a command output control apparatus 100 includes a command issuance unit 101, a command holding unit 102, a command output control unit 103, a memory I/F unit 104, a memory 105, a page boundary division unit 106, a subcommand holding unit 107, an attribute information holding unit 108, an access area division unit 109, a subcommand number comparison unit 110, a size comparison unit 111, a size judgment unit 112, an address comparison unit 113, and the like.

The command issuance unit 101 issues a command for accessing the memory 105, and outputs the issued command to the command holding unit 102.

The command holding unit 102 holds a command outputted from the command issuance unit 101. The command holding unit 102 outputs the held command to the page boundary division unit 106, according to a control signal outputted from the command output control unit 103. As one example, the command holding unit 102 is composed of registers 102a to 102c and a selector 102d. The command outputted from the command issuance unit 101 is held in one of the registers 102a to 102c. When the control signal from the command output control unit 103 is inputted to the selector 102d, one of the registers 102a to 102c is selected by the selector 102d according to the inputted control signal, and the command held in the selected register is outputted to the page boundary division unit 106.

The command output control unit 103 controls the command holding unit 102 so that a command held in the command holding unit 102 is outputted to the page boundary division unit 106. The command output control unit 103 also controls the memory I/F unit 104 so that a subcommand included in a subcommand group is outputted from the memory I/F unit 104 to the memory 105.

For example, suppose a plurality of commands held in the command holding unit 102 include a first command and a second command for accessing different banks. Here, the first command is a command for accessing a first storage area in a first bank, whereas the second command is a command for accessing a second storage area in a second bank. In this case, the command output control unit 103 selects the first command and the second command from the plurality of commands, and controls the command holding unit 102 to output the selected first command and second command to the page boundary division unit 106. To do so, the command output control unit 103 outputs a control signal for selecting a register in which the first command is held, to the selector 102d. The command output control unit 103 also outputs a control signal for selecting a register in which the second command is held, to the selector 102d.

Further suppose a first subcommand group is generated from the first command and a second subcommand group is generated from the second command. In this case, the command output control unit 103 controls the memory I/F unit 104 to alternately output a subcommand included in the first subcommand group and a subcommand included in the second subcommand group to the memory 105. As a result, the first bank and the second bank in the memory 105 are accessed alternately.

In addition, the command output control unit 103 performs control so that, among subcommands held in the subcommand holding unit 107, a subcommand for accessing a partial storage area smaller than a predetermined size is outputted subsequent to a subcommand for accessing a partial storage area no smaller than the predetermined size, according to a result of specification by the size judgment unit 112.

Furthermore, the command output control unit 103 selects, from the subcommands held in the subcommand holding unit 107, a subcommand with a smaller displacement from an address of a partial storage area accessed by a subcommand outputted earlier, according to a result of comparison by the address comparison unit 113. The command output control unit 103 controls the memory I/F unit 104 to output the selected subcommand to the memory 105.

The memory I/F unit 104 extracts a subcommand selected by the command output control unit 103 from the subcommand holding unit 107, and outputs the extracted subcommand to the memory 105.

The memory 105 is a Synchronous Dynamic Random Access Memory (SDRAM) having a multi-bank architecture, as one example. Note that the memory 105 may be provided internal to the command output control apparatus 100, or external to the command output control apparatus 100.

The page boundary division unit 106 divides, when a command outputted from the command holding unit 102 is inputted, a storage area to be accessed by the inputted command by a page boundary. The page boundary division unit 106 generates subcommands for accessing partial storage areas obtained by dividing the storage area. In the case where such a subcommand group is generated from the inputted command, the page boundary division unit 106 stores the generated subcommand group in the subcommand holding unit 107, instead of the inputted command. In the case where no subcommand group is generated, the page boundary division unit 106 stores the inputted command in the subcommand holding unit 107 as a subcommand.

The subcommand holding unit 107 holds a subcommand group and the like generated by the page boundary division unit 106, the access area division unit 109, and so on. As one example, the subcommand holding unit 107 holds the first subcommand group and the second subcommand group.

The attribute information holding unit 108 holds attribute information registered for each subcommand group, such as the number of subcommands included in the subcommand group, a size of an access area of each subcommand, and the like.

The access area division unit 109 selects a subcommand that is subjected to division from subcommands held in the subcommand holding unit 107, and divides an access area of the selected subcommand. In the case where a subcommand group is further generated from the subcommand, the access area division unit 109 stores the generated subcommand group in the subcommand holding unit 107, instead of the subcommand. For example, the access area division unit 109 judges whether or not the numbers of subcommands of two subcommand groups that are subjected to comparison are different, according to a result of comparison by the subcommand number comparison unit 110. As a result of the judgment, when the numbers of subcommands are different, the access area division unit 109 selects, as a subcommand that is subjected to division, a subcommand for accessing an access area of a largest size from a subcommand group with the smaller number of subcommands, according to a result of comparison by the size comparison unit 111. The access area division unit 109 judges whether or not the access area of the selected subcommand is no smaller than a threshold. As a result of the judgment, when the access area of the selected subcommand is no smaller than the threshold, the access area division unit 109 divides the access area of the selected subcommand. The access area division unit 109 generates subcommands for accessing partial storage areas obtained by the division, and replaces the selected subcommand by such a generated subcommand group. The access area division unit 109 also generates attribute information relating to the generated subcommand group, and registers the generated attribute information in the attribute information holding unit 108. When the access area of the selected subcommand is smaller than the threshold, on the other hand, the access area division unit 109 does not divide the access area. The threshold used here is such a value that incurs no overhead.

The subcommand number comparison unit 110 compares the numbers of subcommands of two subcommand groups that are subjected to comparison. In detail, the subcommand number comparison unit 110 compares the number of subcommands included in the first subcommand group and the number of subcommands included in the second subcommand group. According to a result of the comparison, the subcommand number comparison unit 110 selects one of the first storage area and the second storage area that corresponds to the smaller number of subcommands, as a storage area that is subjected to division.

The size comparison unit 111 compares sizes of access areas to be accessed by subcommands included in a subcommand group. In detail, the size comparison unit 111 compares sizes of access areas of subcommands included in a subcommand group. According to a result of the comparison, the size comparison unit 111 selects a partial storage area no smaller than the predetermined size from partial storage areas constituting the storage area that is subjected to division, as a partial storage area that is subjected to the division.

The size judgment unit 112 specifies sizes of access areas to be accessed by subcommands. For example, the size judgment unit 112 compares sizes of access areas of every combination of subcommands included in a subcommand group that is subjected to output, and specifies a subcommand for accessing an access area of a largest size or specifies a subcommand for accessing an access area smaller than the predetermined size.

The address comparison unit 113 compares addresses of access areas to be accessed by subcommands included in a subcommand group. For example, the address comparison unit 113 compares row and column addresses of subcommands that are judged as applicable by the size judgment unit 112, and selects a subcommand with a smaller bit displacement in an address bus of the memory 105 from the applicable subcommands.

The following describes a process in which an access area is divided by the page boundary division unit 106 in this embodiment.

Figure 2:
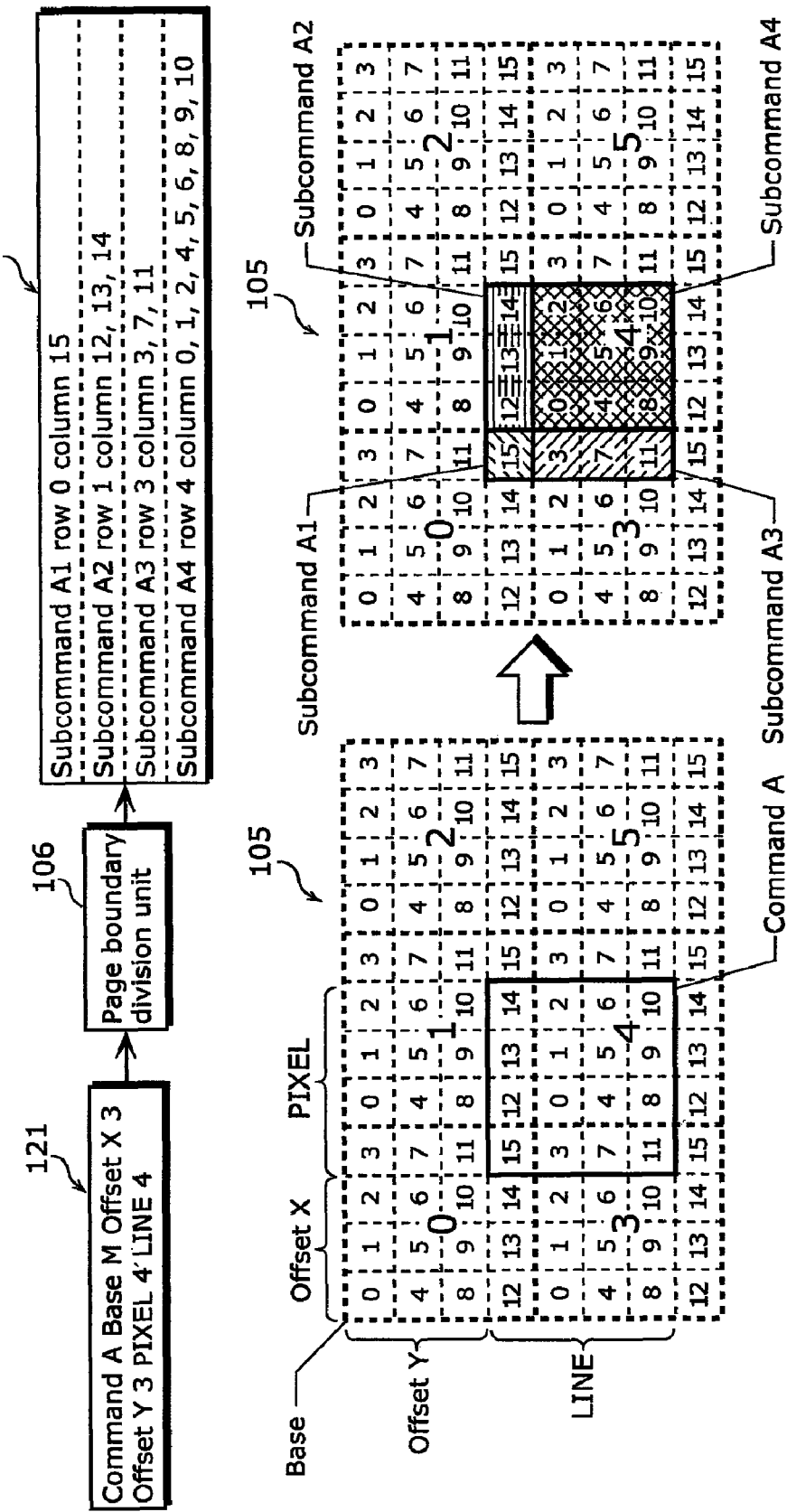
FIG. 2 shows a process in which an access area is divided by a page boundary division unit in the first embodiment of the present invention.

FIG. 2 shows a process in which an access area is divided by the page boundary division unit 106 in this embodiment. For example, when command A that extends over more than one page such as a command 121 is inputted, the page boundary division unit 106 divides a storage area (hereafter referred to as access area A) to be accessed by command A by a page boundary, as shown in FIG. 2.

In FIG. 2, access area A is a rectangular area enclosed by a thick-line box without hatching, and is a storage area indicated by PIXEL (4) from offset X (3) and LINE (4) from offset Y (3) with reference to base M.

The page boundary division unit 106 then generates a subcommand individually for each of access area A1, access area A2, access area A3, and access area A4 obtained by dividing access area A by a page boundary. Here, subcommand A1 for accessing access area A1, subcommand A2 for accessing access area A2, subcommand A3 for accessing access area A3, and subcommand A4 for accessing access area A4 are generated as shown in a subcommand group 122.

In FIG. 2, access area A1 is a rectangular area corresponding to an upper left part of access area A, and is a storage area indicated by row (0) and column (15). Access area A2 is a rectangular area corresponding to an upper right part of access area A, and is a storage area indicated by row (1) and column (12, 13, 14). Access area A3 is a rectangular area corresponding to a lower left part of access area A, and is a storage area indicated by row (3) and column (3, 7, 11). Access area A4 is a rectangular area corresponding to a lower right part of access area A, and is a storage area indicated by row (4) and column (0, 1, 2, 4, 5, 6, 8, 9, 10).

The following describes an access area divided by the page boundary division unit 106 and the access area division unit 109 in this embodiment.

Figure 3:
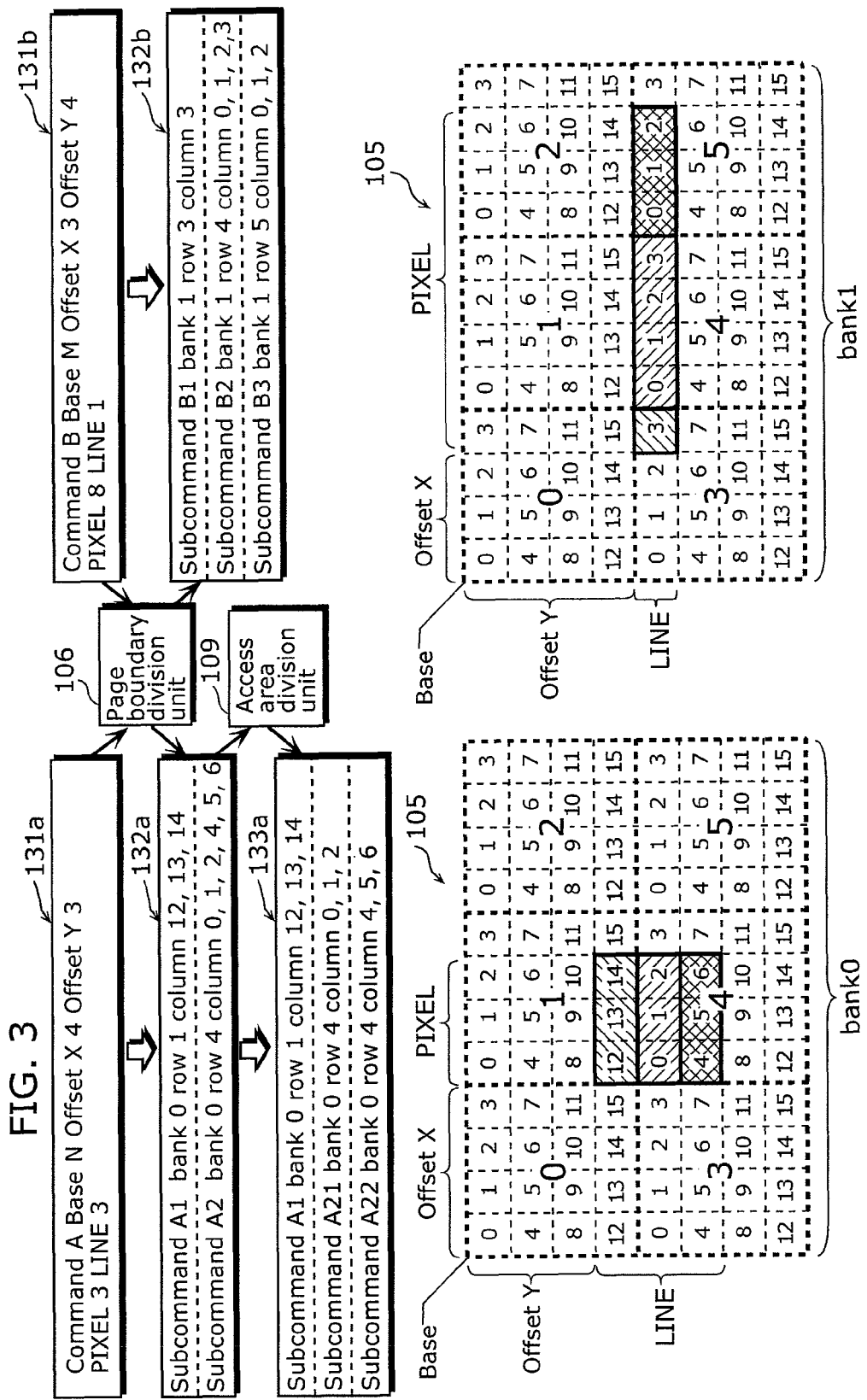
FIG. 3 shows an access area divided by the page boundary division unit and an access area division unit in the first embodiment of the present invention.

FIG. 3 shows an access area divided by the page boundary division unit 106 and the access area division unit 109 in this embodiment. For example, when command A that extends over more than one page such as a command 131a is inputted, the page boundary division unit 106 divides a storage area (hereafter referred to as access area A) to be accessed by command A by a page boundary, as shown in FIG. 3.

In FIG. 3, access area A is a rectangular area enclosed by a thick-line box in a storage area of bank (0) shown on the left, and is a storage area in bank (0) indicated by PIXEL (3) from offset X (4) and LINE (3) from offset Y (3) with reference to base N.

The page boundary division unit 106 then generates a subcommand individually for each of access area A1 and access area A2 obtained by dividing access area A by a page boundary. Here, subcommand A1 for accessing access area A1 and subcommand A2 for accessing access area A2 are generated as shown in a subcommand group 132a.

In FIG. 3, access area A1 is a rectangular area corresponding to an upper part of access area A, and is a storage area in bank (0) indicated by row (1) and column (12, 13, 14). Access area A2 is a rectangular area corresponding to a lower part of access area A, and is a storage area in bank (0) indicated by row (4) and column (0, 1, 2, 4, 5, 6).

On the other hand, for example when command B that extends over more than one page such as a command 131b is inputted, the page boundary division unit 106 divides a storage area (hereafter referred to as access area B) to be accessed by command B by a page boundary.

In FIG. 3, access area B is a rectangular area enclosed by a thick-line box in a storage area of bank (1) shown on the right, and is a storage area in bank (1) indicated by PIXEL (8) from offset X (3) and LINE (1) from offset Y (4) with reference to base M.

The page boundary division unit 106 then generates a subcommand individually for each of access area B1, access area B2, and access area B3 obtained by dividing access area B by a page boundary. Here, subcommand B1 for accessing access area B1, subcommand B2 for accessing access area B2, and subcommand B3 for accessing access area B3 are generated as shown in a subcommand group 132b.

In FIG. 3, access area B1 is a rectangular area corresponding to a left part of access area B, and is a storage area in bank (1) indicated by row (3) and column (3). Access area B2 is a rectangular area corresponding to a middle part of access area B, and is a storage area in bank (1) indicated by row (4) and column (0, 1, 2, 3). Access area B3 is a rectangular area corresponding to a right part of access area B, and is a storage area in bank (1) indicated by row (5) and column (0, 1, 2).

This being the case, when subcommands are alternately outputted from the subcommand group 132a and the subcommand group 132b, there is an instance where overhead appears without being concealed because the number of subcommands (2) of the subcommand group 132a and the number of subcommands (3) of the subcommand group 132b are different.

In order to conceal such overhead, it is necessary to make the numbers of subcommands equal. To make the numbers of subcommands equal, the number of subcommands (2) of the subcommand group 132a and the number of subcommands (3) of the subcommand group 132b are compared with each other, and access area division is performed for the subcommand group 132a with the smaller number of subcommands to thereby increase the number of subcommands.

In more detail, the access area division unit 109 selects a subcommand for accessing a largest access area, from the subcommand group 132a. In this example, access area A2 is largest, so that subcommand A2 is selected. The access area division unit 109 divides access area A2, and generates a subcommand individually for each of access area A21 and access area A22 obtained by dividing access area A2. Here, subcommand A21 for accessing access area A21 and subcommand A22 for accessing access area A22 are generated as shown in a subcommand group 133a.

In FIG. 3, access area A21 is a rectangular area corresponding to an upper part of access area A2, and is a storage area in bank (0) indicated by row (4) and column (0, 1, 2). Access area A22 is a rectangular area corresponding to a lower part of access area A2, and is a storage area in bank (0) indicated by row (4) and column (4, 5, 6).

The number of subcommands of the subcommand group 133a generated in this way is equal to the number of subcommands of the subcommand group 132b. Accordingly, when subcommands are alternately outputted from the subcommand group 133a and the subcommand group 132b, overhead does not appear as it is successfully concealed.

Note that, when performing such access area division to make the numbers of subcommands equal, if a size of an access area obtained as a result of the division is smaller than the predetermined size, overhead appears without being concealed. Therefore, when performing access area division, an access area no smaller than the predetermined size is subjected to the division.

The following describes attribute information generated by the page boundary division unit 106 and the access area division unit 109 in this embodiment, using the case shown in FIG. 3 as an example.

Figure 4:
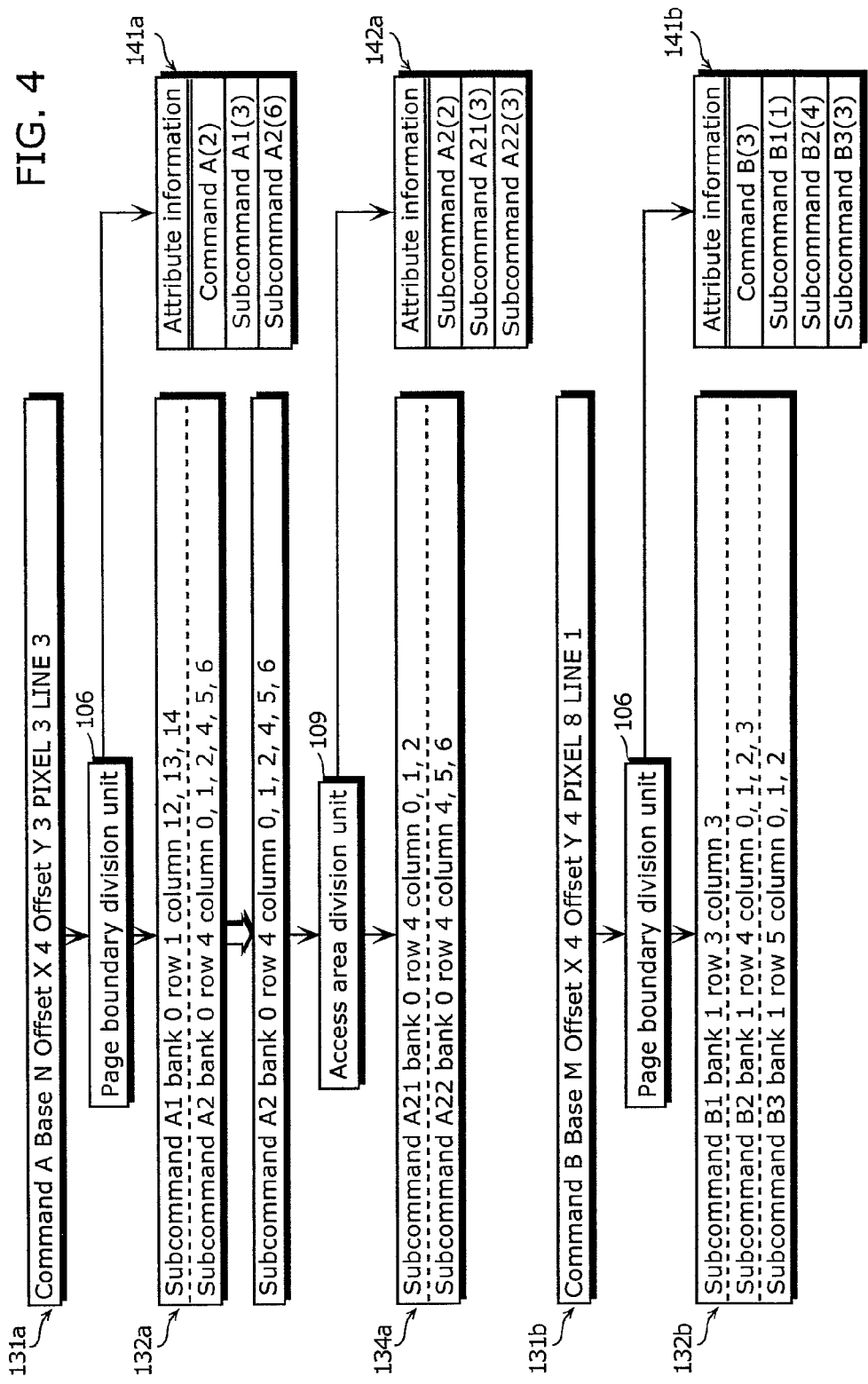
FIG. 4 shows attribute information generated by the page boundary division unit and the access area division unit in the first embodiment of the present invention.

FIG. 4 shows attribute information generated by the page boundary division unit 106 and the access area division unit 109 in this embodiment. For example, when command A that extends over more than one page such as the command 131a is inputted, the page boundary division unit 106 divides access area A by a page boundary, as shown in FIG. 4. The page boundary division unit 106 also generates attribute information 141a including information "command A (2), subcommand A1 (3), subcommand A2 (6)", and registers the generated attribute information 141a in the attribute information holding unit 108.

Here, "command A (2)" indicates that the number of subcommands generated from command A is 2, "subcommand A1 (3)" indicates that a size of access area A1 is 3, and "subcommand A2 (6)" indicates that a size of access area A2 is 6.

Moreover, for example when command B that extends over more than one page such as the command 131b is inputted, the page boundary division unit 106 divides access area B by a page boundary. When doing so, the page boundary division unit 106 generates attribute information 141b including information "command B (3), subcommand B1 (1), subcommand B2 (4), subcommand B3 (3)", and registers the generated attribute information 141b in the attribute information holding unit 108.

Here, "command B (3)" indicates that the number of subcommands generated from command B is 3, "subcommand B1 (1)" indicates that a size of access area B1 is 1, "subcommand B2 (4)" indicates that a size of access area B2 is 4, and "subcommand B3 (3)" indicates that a size of access area B3 is 3.

To make the numbers of subcommands equal, the access area division unit 109 selects a subcommand for accessing a largest access area from the subcommand group 132a. In this example, access area A2 is largest, so that subcommand A2 is selected. The access area division unit 109 divides access area A2, and generates a subcommand individually for each of access area A21 and access area A22 obtained by dividing access area A2. Here, subcommand A21 for accessing access area A21 and subcommand A22 for accessing access area A22 are generated as shown in a subcommand group 134a. The access area division unit 109 also generates attribute information 142a including information "subcommand A2 (2), subcommand A21 (3), subcommand A22 (3)", and registers the generated attribute information 142a in the attribute information holding unit 108.

Here, "subcommand A2 (2)" indicates that the number of subcommands generated from subcommand A2 is 2, "subcommand A21 (3)" indicates that a size of access area A21 is 3, and "subcommand A22 (3)" indicates that a size of access area A22 is 3.

The following describes a data structure of attribute information held in the attribute information holding unit 108 in this embodiment.

Figure 5:
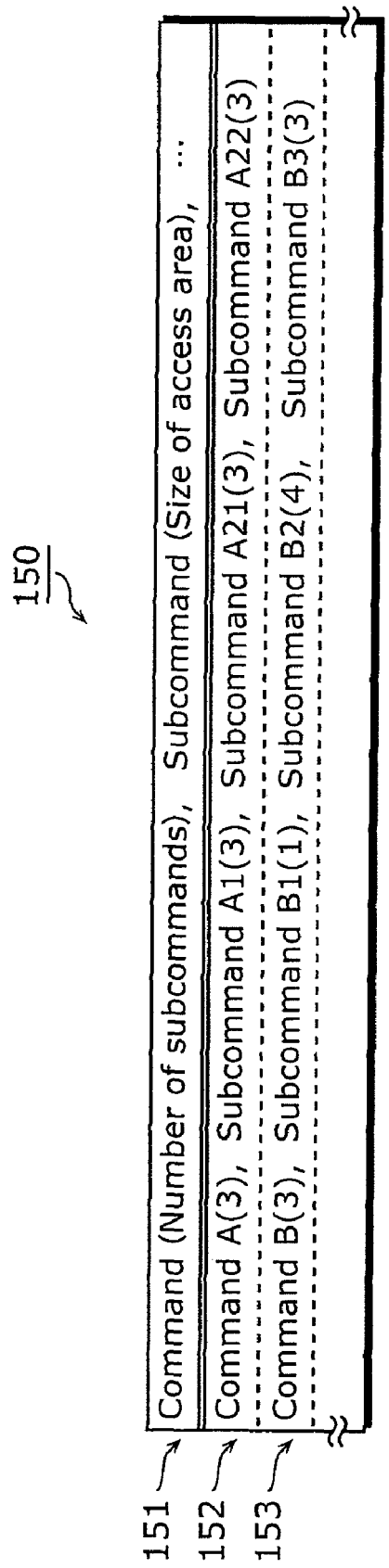
FIG. 5 shows a data structure of attribute information held in an attribute information holding unit in the first embodiment of the present invention.

FIG. 5 shows a data structure of attribute information held in the attribute information holding unit 108 in this embodiment. As shown in FIG. 5, "command (number of subcommands), subcommand (size of access area), . . . " (record 151) is registered for each command in attribute information 150.

For example, "command A (3), subcommand A1 (3), subcommand A21 (3), subcommand A22 (3)" (record 152) and "command B (3), subcommand B1 (1), subcommand B2 (4), subcommand B3 (3)" (record 153) are registered in the case shown in FIG. 4.

The following describes an operation of the command output control apparatus 100 in this embodiment.

Figure 6:
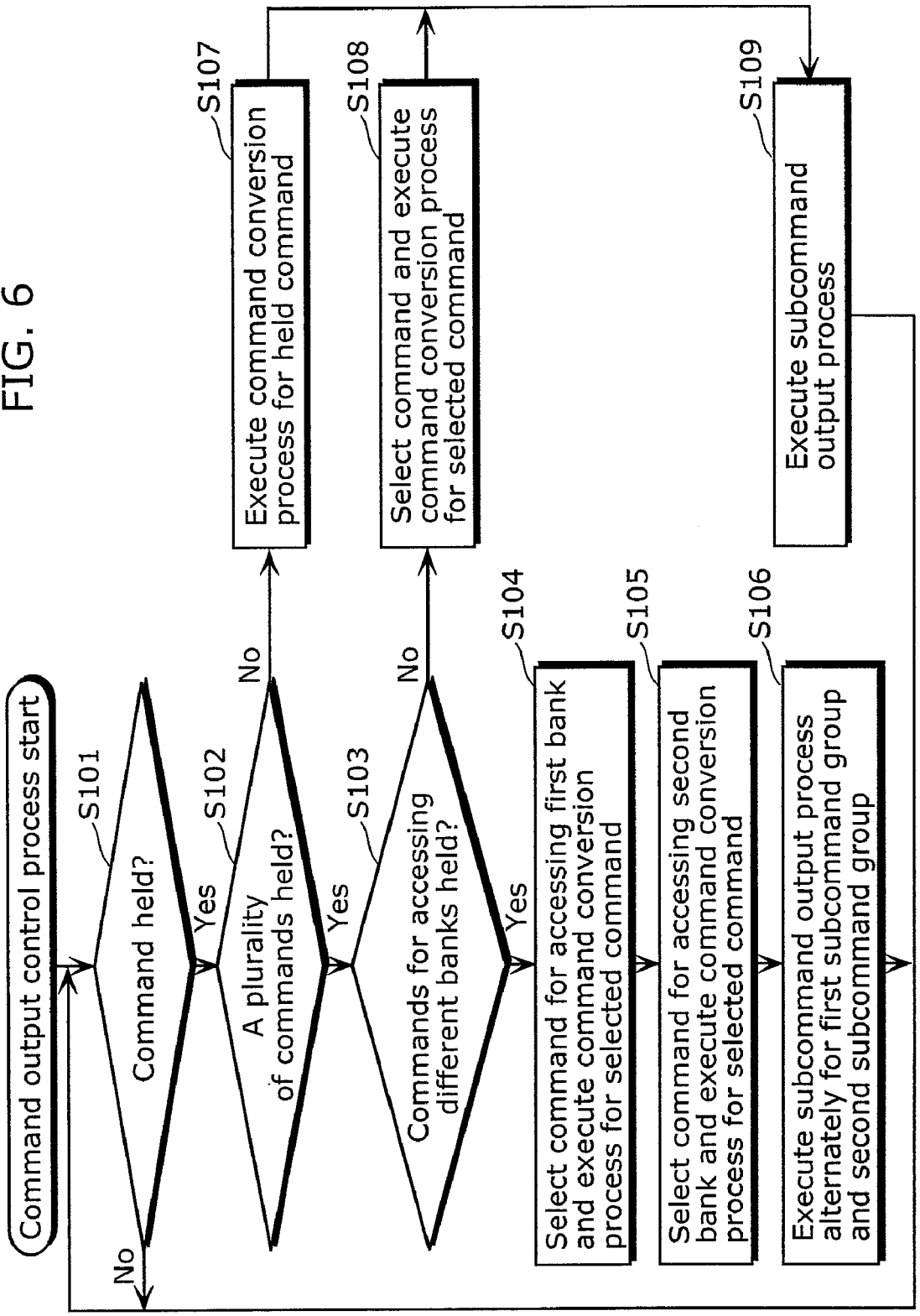
FIG. 6 shows a command output control process performed in the command output control apparatus in the first embodiment of the present invention.

FIG. 6 shows a command output control process performed in the command output control apparatus 100 in this embodiment. As shown in FIG. 6, the command output control apparatus 100 repeatedly performs the following command output control process (Steps S101 to S109).

(Step S101) The command output control unit 103 judges whether or not a command is held in the command holding unit 102. As a result of the judgment, when a command is held (Step S101: Yes), the command output control unit 103 performs Step S102 described below. When no command is held (Step S101: No), the command output control unit 103 performs Step S101 again.

(Step S102) The command output control unit 103 judges whether or not a plurality of commands are held in the command holding unit 102. As a result of the judgment, when a plurality of commands are held (Step S102: Yes), the command output control unit 103 performs Step S103 described below. When a plurality of commands are not held (Step S102: No), the command output control unit 103 performs Step S107 described below.

(Step S103) The command output control unit 103 judges whether or not the plurality of commands held in the command holding unit 102 include commands for accessing different banks. As a result of the judgment, when commands for accessing different banks are included (Step S103: Yes), the command output control unit 103 performs Steps S104 to S106 described below. When commands for accessing different banks are not included (Step S103: No), the command output control unit 103 performs Step S108 described below. To detect commands for accessing different banks from commands held in the registers 102a to 102c, the command output control unit 103 may check every combination of commands, or may record an order in which the commands are issued and perform checking in the order of issuance.

As one example, it is assumed here that the first command and the second command are issued from the command issuance unit 101 in this order.

(Step S104) The command output control unit 103 selects the first command from the plurality of commands, and controls the command holding unit 102 to output the selected first command. The command output control unit 103 then causes a command conversion process (for example, see FIG. 7) to be performed on the outputted first command. To do so, the command output control unit 103 outputs a control signal for selecting a register in which the first command is held, to the selector 102*d*.

As one example, it is assumed here that the first subcommand group is generated from the first command as a result of the command conversion process.

(Step S105) The command output control unit 103 also selects the second command from the plurality of commands, and controls the command holding unit 102 to output the selected second command. The command output control unit 103 then causes the command conversion process (for example, see FIG. 7) to be performed on the outputted second command. To do so, the command output control unit 103 outputs a control signal for selecting a register in which the second command is held, to the selector 102*d*.

As one example, it is assumed here that the second subcommand group is generated from the second command as a result of the command conversion process.

(Step S106) The command output control unit 103 controls the memory I/F unit 104 to perform a subcommand output process (for example, see FIG. 10) alternately on the first subcommand group and the second subcommand group. As a result, subcommands in the first subcommand group and subcommands in the second subcommand group are alternately outputted from the memory I/F unit 104 to the memory 105. Thus, the first bank and the second bank in the memory 105 are accessed alternately. After this, the command output control unit 103 performs above Step S101 again.

(Step S107) The command output control unit 103 controls the command holding unit 102 to output the command held in the command holding unit 102, and causes the command conversion process (for example, see FIG. 7) to be performed on the outputted command. To do so, the command output control unit 103 outputs a control signal for selecting a register in which the command is held, to the selector 102*d*. The command output control unit 103 then performs Step S109 described below.

(Step S108) The command output control unit 103 selects a command from the plurality of commands held in the command holding unit 102, and controls the command holding unit 102 to output the selected command. The command output control unit 103 then causes the command conversion process (for example, see FIG. 7) to be performed on the outputted command. Here, the command output control unit 103 may perform the selection in the order of issuance, or may record a type of a command outputted earlier and select the same type of command as the earlier outputted command with priority. The command output control unit 103 then performs Step S109 described below.

(Step S109) The command output control unit 103 controls the memory I/F unit 104 to perform the subcommand output process on a subcommand group. As a result, subcommands in the subcommand group are outputted from the memory I/F unit 104 to the memory 105. The command output control unit 103 then performs above Step S101 again.

Figure 7:
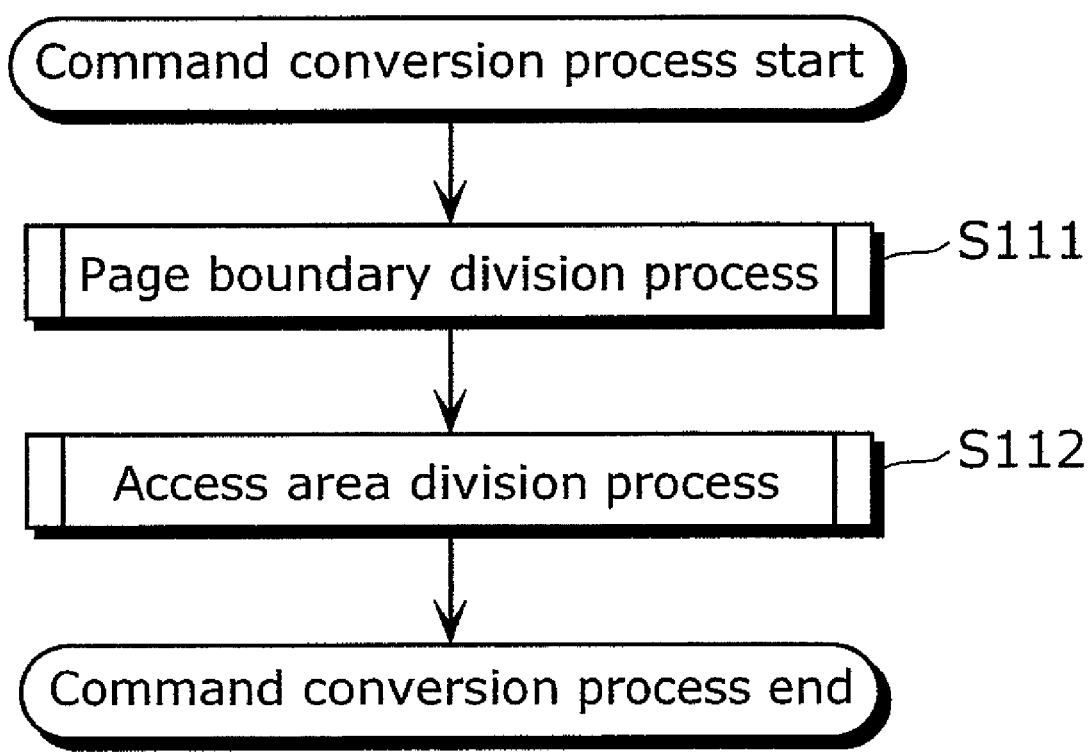
FIG. 7 shows a command conversion process performed in the command output control apparatus in the first embodiment of the present invention.

FIG. 7 shows the command conversion process performed in the command output control apparatus 100 in this embodiment. As shown in FIG. 7, when a command is outputted from the command holding unit 102, the command output control apparatus 100 performs the following command conversion process (Steps S111 and S112), and then ends the command conversion process.

(Step S111) When a command outputted from the command holding unit 102 is inputted, the page boundary division unit 106 performs a page boundary division process (for example, see FIG. 8) on the inputted command. In the case where a subcommand group is generated from the inputted command, the page boundary division unit 106 stores the generated subcommand group in the subcommand holding unit 107, instead of the inputted command. In the case where no subcommand group is generated from the inputted command, the page boundary division unit 106 stores the inputted command in the subcommand holding unit 107 as a subcommand.

(Step S112) The access area division unit 109 performs an access area division process (for example, see FIG. 9) on a subcommand held in the subcommand holding unit 107, at a predetermined timing. In the case where a subcommand group is further generated from the subcommand, the access area division unit 109 stores the generated subcommand group in the subcommand holding unit 107, instead of the subcommand.

Figure 8:
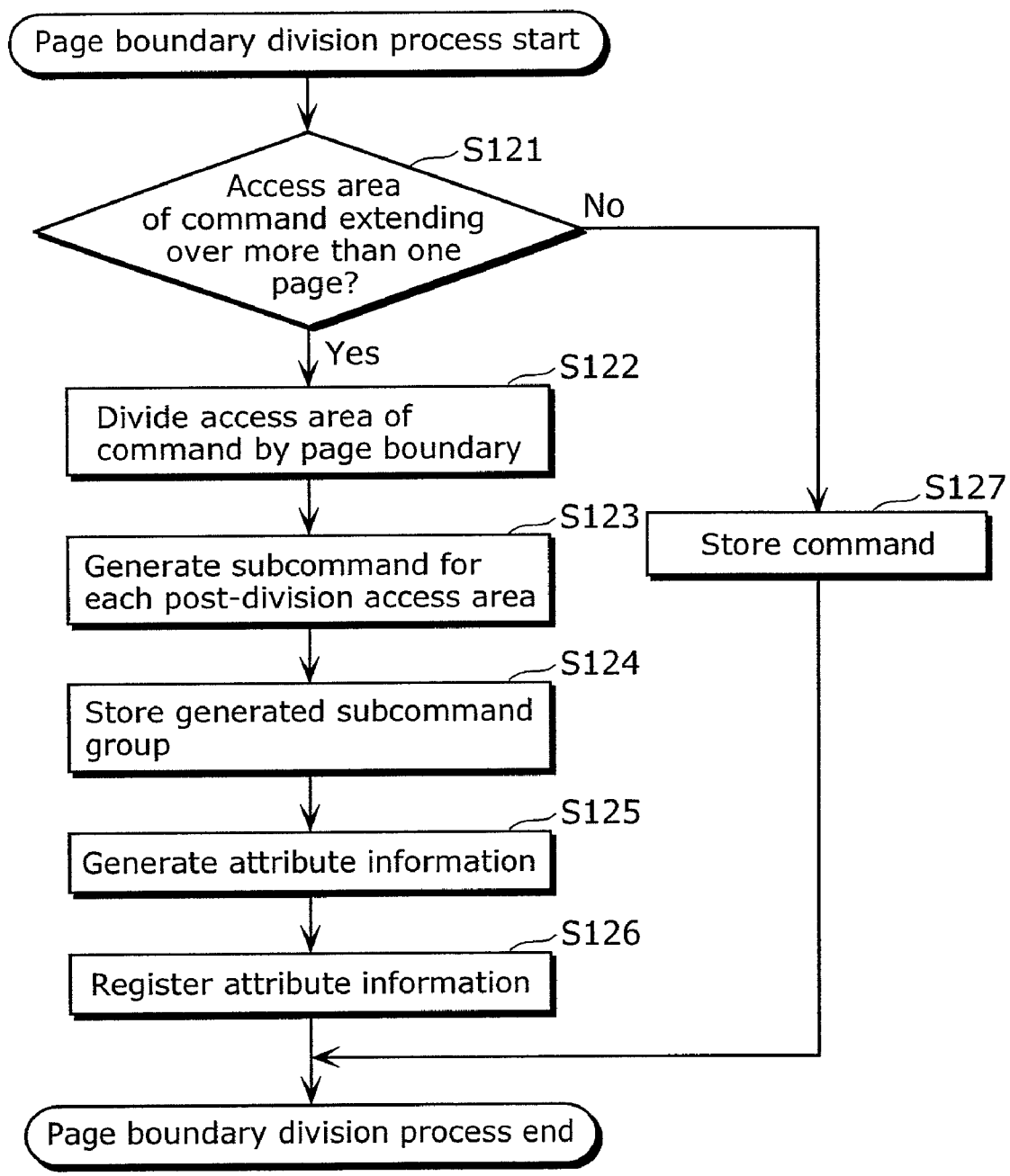
FIG. 8 shows a page boundary division process performed in the command output control apparatus in the first embodiment of the present invention.

FIG. 8 shows the page boundary division process performed in the command output control apparatus 100 in this embodiment. As shown in FIG. 8, the command output control apparatus 100 performs the following page boundary division process (Steps S121 to S127).

(Step S121) The page boundary division unit 106 judges whether or not an access area of an inputted command extends over more than one page. As a result of the judgment, when the access area of the inputted command extends over more than one page (Step S121: Yes), the page boundary division unit 106 performs Steps S122 to S126 described below, and ends the page boundary division process. When the access area of the inputted command does not extend over more than one page (Step S121: No), the page boundary division unit 106 performs Step S127 described below, and ends the page boundary division process.

(Step S122) The page boundary division unit 106 divides the access area of the inputted command by a page boundary. As a result, the access area is divided into a plurality of areas (hereafter referred to as post-division access areas).

(Step S123) The page boundary division unit 106 generates a subcommand for each post-division access area. Hence a subcommand for accessing each post-division access area is generated.

(Step S124) The page boundary division unit 106 stores a generated subcommand group in the subcommand holding unit 107.

(Step S125) The page boundary division unit 106 generates attribute information relating to the generated subcommand group. Thus, attribute information including the number of subcommands included in the subcommand group and a size of an access area of each subcommand is generated.

(Step S126) The page boundary division unit 106 registers the generated attribute information in the attribute information holding unit 108.

(Step S127) The page boundary division unit 106 stores the inputted command in the subcommand holding unit 107 as a subcommand.

Figure 9:
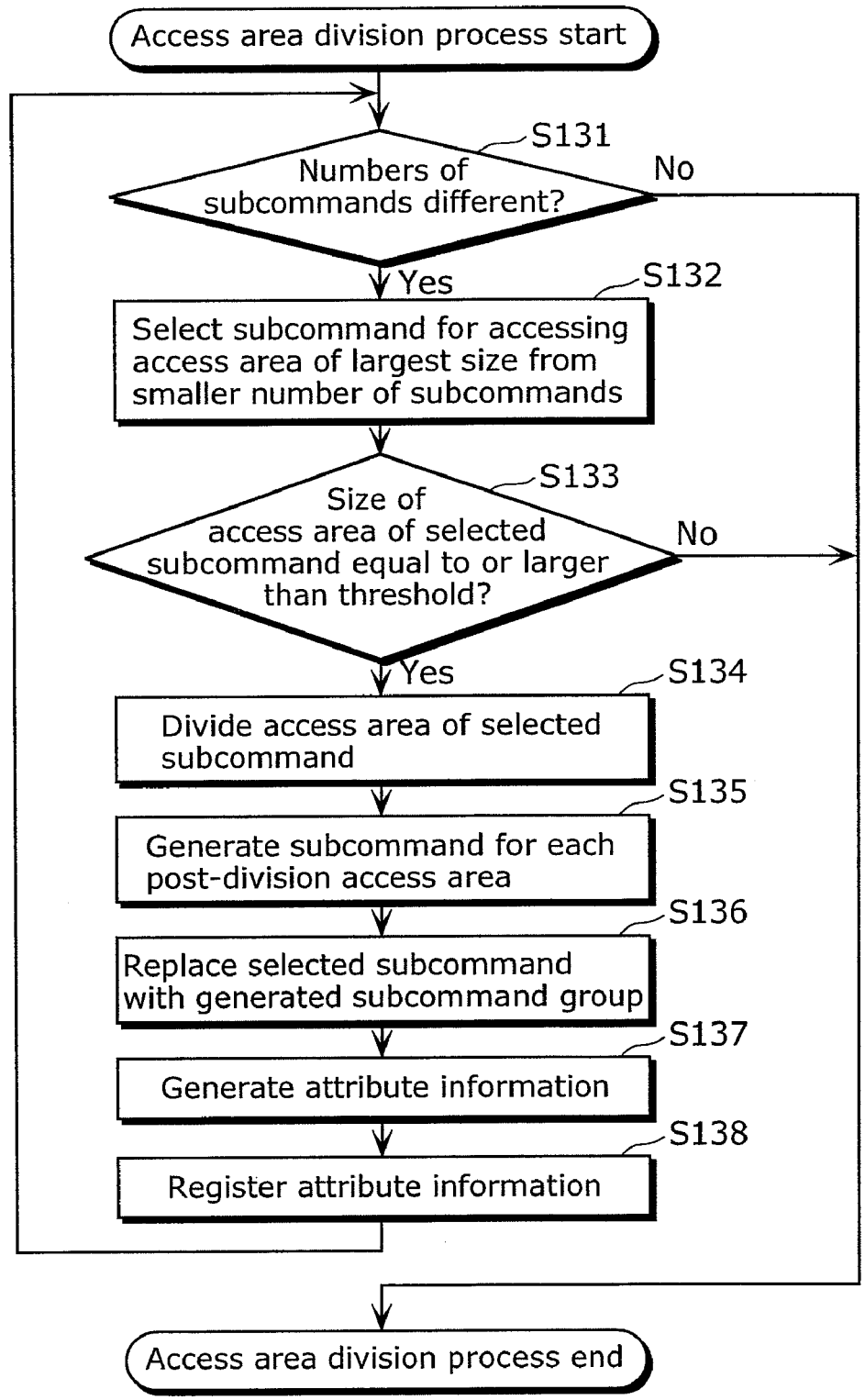
FIG. 9 shows an access area division process performed in the command output control apparatus in the first embodiment of the present invention.

FIG. 9 shows the access area division process performed in the command output control apparatus 100 in this embodiment. As shown in FIG. 9, the command output control apparatus 100 performs the following access area division process (Steps S131 to S138).

(Step S131) The access area division unit 109 judges whether or not the numbers of subcommands of two subcommand groups that are subjected to comparison are different, according to a result of comparison by the subcommand number comparison unit 110. As a result of the judgment, when the numbers of subcommands are different (Step S131: Yes), the access area division unit 109 performs Steps S132 and S133 described below. When the numbers of subcommands are equal (Step S131: No), the access are division unit 109 ends the access area division process.

Here, the subcommand number comparison unit 110 acquires, for each of the two subcommand groups that are subjected to the comparison, number information about the number of subcommands included in the subcommand group, from attribute information held in the attribute information holding unit 108. The subcommand number comparison unit 110 compares the acquired two sets of number information, and outputs a result of the comparison to the access area division unit 109.

(Step S132) The access area division unit 109 selects a subcommand for accessing an access area of a largest size from a subcommand group with the smaller number of subcommands, according to a result of comparison by the size comparison unit 111.

(Step S133) The access area division unit 109 judges whether or not the access area of the selected subcommand is no smaller than the threshold. As a result of the judgment, when the access area of the selected subcommand is no smaller than the threshold (Step S133: Yes), the access area division unit 109 performs Steps S134 to S138 described below. When the access area of the selected subcommand is smaller than the threshold (Step S133: No), the access area division unit 109 ends the access area division process.

(Step S134) The access area division unit 109 divides the access area of the selected subcommand.

(Step S135) The access area division unit 109 generates a subcommand for each post-division access area.

(Step S136) The access area division unit 109 replaces the selected subcommand with a generated subcommand group.

(Step S137) The access area division unit 109 generates attribute information relating to the generated subcommand group.

(Step S138) The access area division unit 109 registers the generated attribute information in the attribute information holding unit 108.

Figure 10:
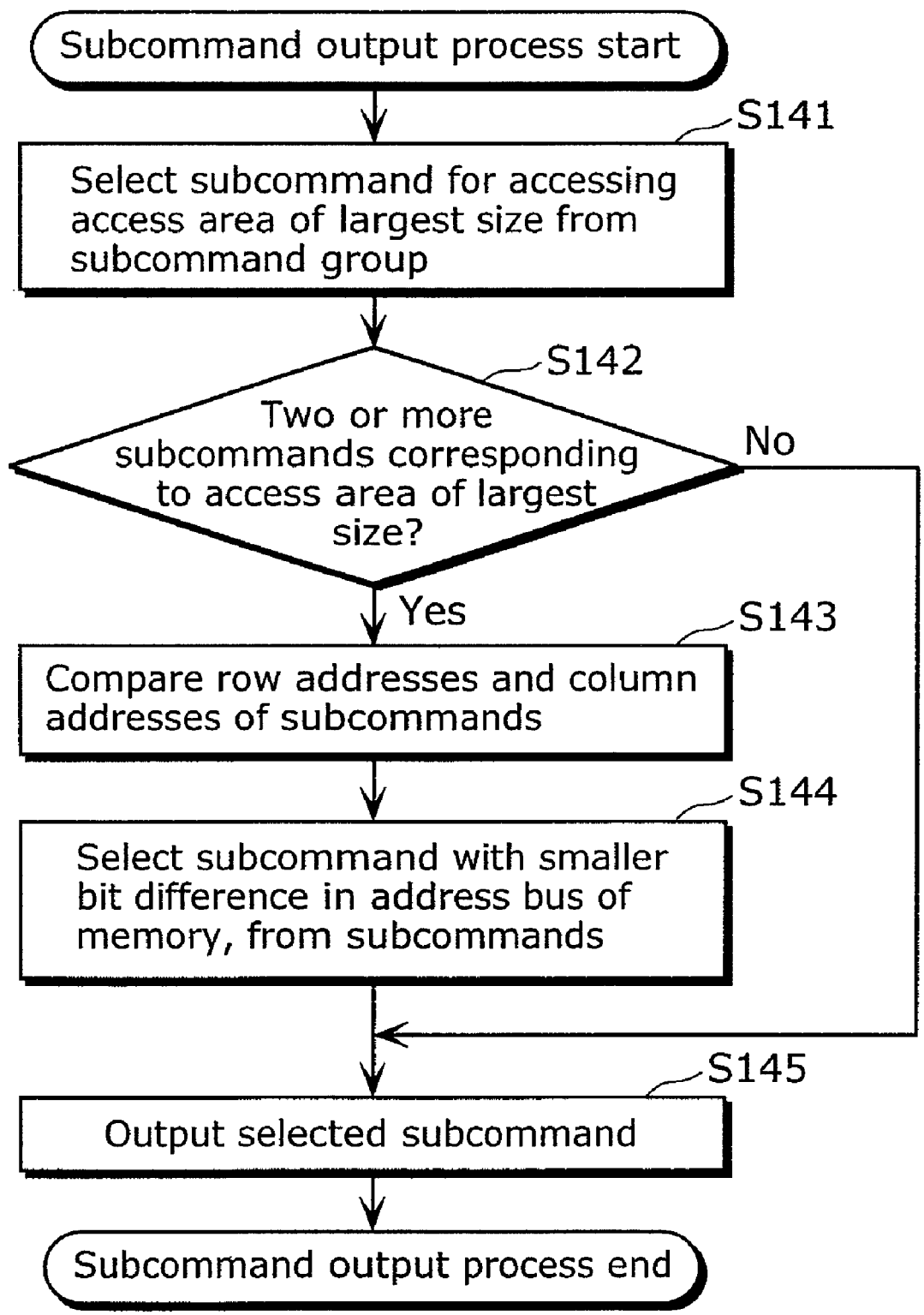
FIG. 10 shows a subcommand output process performed in the command output control apparatus in the first embodiment of the present invention.

FIG. 10 shows the subcommand output process performed in the command output control apparatus 100 in this embodiment. As shown in FIG. 10, the command output control apparatus 100 performs the following subcommand output process (Steps S141 to S145).

(Step S141) The command output control unit 103 selects a subcommand for accessing an access area of a largest size from a subcommand group that is subjected to output, according to a result of judgment by the size judgment unit 112. To do so, the command output control unit 103 controls the size judgment unit 112 to perform Step S142 described below.

The command output control unit 103 then controls the memory I/F unit 104 to perform Step S145 described below, to output the selected subcommand to the memory 105.

(Step S142) The size judgment unit 112 compares sizes of access areas of every combination of subcommands included in the subcommand group that is subjected to the output, to specify a subcommand for accessing an access area of a largest size. In the case where two or more subcommands correspond to the largest size, the command output control unit 103 controls the address comparison unit 113 to perform Steps S143 and S144 described below. In the case where only one subcommand corresponds to the largest size, the command output control unit 103 controls the memory I/F unit 104 to perform Step S145 described below, without performing Steps S143 and S144 described below.

(Step S143) The address comparison unit 113 compares row and column addresses of the subcommands which are specified by the size judgment unit 112. The address comparison unit 113 then performs Step S144 described below.

(Step S144) The address comparison unit 113 selects a subcommand with a smaller bit displacement in the address bus of the memory 105, from the specified subcommands. The command output control unit 103 then controls the memory I/F unit 104 to perform Step S145 described below.

(Step S145) The memory I/F Unit 104 extracts the subcommand selected by the command output control unit 103 from the subcommand holding unit 107, and outputs the extracted subcommand to the memory 105.

The following describes an operation example using a timing chart of signals outputted to the memory 105 from the command output control apparatus 100 in this embodiment.

Figure 11:
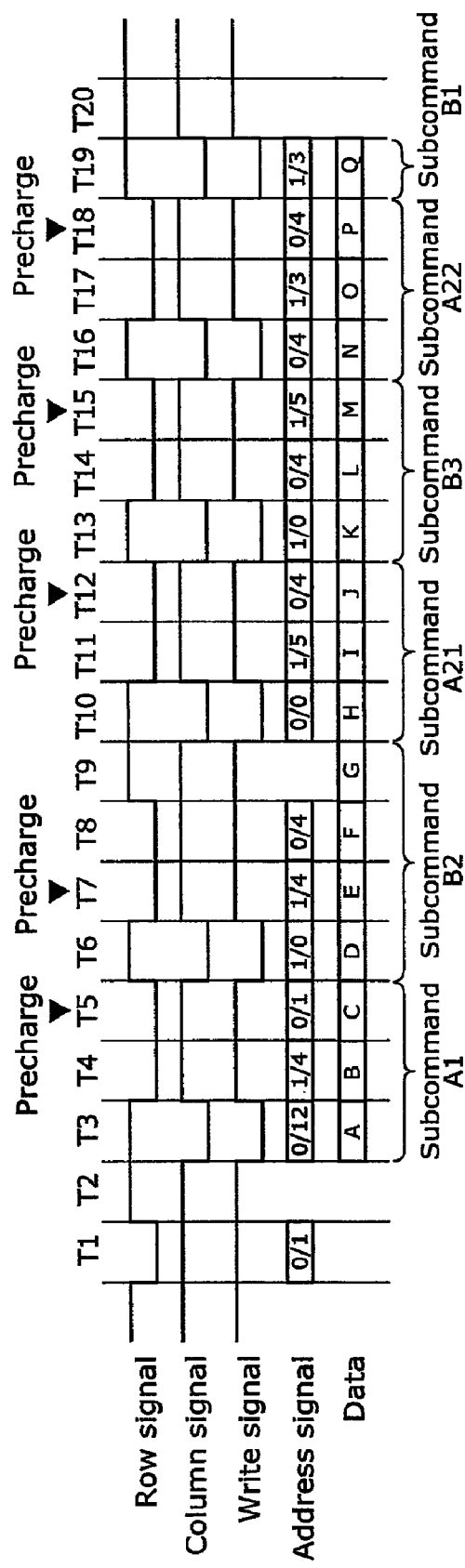
FIG. 11 shows a timing chart of signals outputted to a memory from the command output control apparatus in the first embodiment of the present invention.

FIG. 11 shows a timing chart of signals outputted to the memory 105 from the command output control apparatus 100 in this embodiment. As shown in FIG. 11, the following describes the case where the command output control unit 103 controls the memory I/F unit 104 to alternately output the subcommand group 133a and the subcommand group 132b shown in FIG. 3, as one example. Note here that subcommand A1, subcommand B2, subcommand A21, subcommand B3, subcommand A22, and subcommand B1 are outputted from the memory I/F unit 104 to the memory 105 in this order.

First, the memory I/F unit 104 decodes subcommand A1, and outputs a control signal group for writing data to bank (0), row (1), and column (12, 13, 14), to the memory 105. In detail, in time T1, the memory I/F unit 104 outputs a row signal (Low) and an address signal (0/1) to the memory 105, to set a row address of an access area to bank (0), row (1). In time T3, the memory I/F unit 104 outputs a column signal (Low) and an address signal (0/12) to the memory 105, to set a column address of the access area to bank (0), column (12). The memory I/F unit 104 also outputs a write signal (Low) to the memory 105, to start writing of data. In times T3 to T5, the memory I/F unit 104 outputs data (A, B, C) to the memory 105, to write the data beginning with bank (0), row (1), column (12) in sequence. In time T5, the memory I/F unit 104 outputs a row signal (Low), an address signal (0/1), and a precharge signal to the memory 105, to precharge bank (0), row (1).

Next, the memory I/F unit 104 decodes subcommand B2, and outputs a control signal group for writing data to bank (1), row (4), column (0, 1, 2, 3), to the memory 105. In detail, in time T4, the memory I/F unit 104 outputs a row signal (Low) and an address signal (1/4) to the memory 105, to set a row address of an access area to bank (1), row (4). In time T6, the memory I/F unit 104 outputs a column signal (Low) and an address signal (1/0) to the memory 105, to set a column address of the access area to bank (1), column (0). The memory I/F unit 104 also outputs a write signal (Low) to the memory 105, to start writing of data. In times T6 to T9, the memory I/F unit 104 outputs data (D, E, F, G) to the memory 105, to write the data beginning with bank (1), row (4), column (0) in sequence. In time T7, the memory I/F unit 104 outputs a row signal (Low), an address signal (1/4), and a precharge signal to the memory 105, to precharge bank (1), row (4).

Next, the memory I/F unit 104 decodes subcommand A21, and outputs a control signal group for writing data to bank (0), row (4), column (0, 1, 2), to the memory 105. In detail, in time T8, the memory I/F unit 104 outputs a row signal (Low) and an address signal (0/4) to the memory 105, to set a row address of an access area to bank (0), row (4). In time T10, the memory I/F unit 104 outputs a column signal (Low) and an address signal (0/0) to the memory 105, to set a column address of the access area to bank (0), column (0). The memory I/F unit 104 also outputs a write signal (Low) to the memory 105, to start writing of data. In times T10 to T12, the memory I/F unit 104 outputs data (H, I, J) to the memory 105, to write the data beginning with bank (0), row (4), column (0) in sequence. In time T12, the memory I/F unit 104 outputs a row signal (Low), an address signal (0/4), and a precharge signal to the memory 105, to precharge bank (0), row (4).

Next, the memory I/F unit 104 decodes subcommand B3, and outputs a control signal group for writing data to bank (1), row (5), column (0, 1, 2), to the memory 105. In detail, in time T11, the memory I/F unit 104 outputs a row signal (Low) and an address signal (1/5) to the memory 105, to set a row address of an access area to bank (1), row (5). In time T13, the memory I/F unit 104 outputs a column signal (Low) and an address signal (1/0) to the memory 105, to set a column address of the access area to bank (1), column (0). The memory I/F unit 104 also outputs a write signal (Low) to the memory 105, to start writing of data. In times T13 to T15, the memory I/F unit 104 outputs data (K, L, M) to the memory 105, to write the data beginning with bank (1), row (5), column (0) in sequence. In time T15, the memory I/F unit 104 outputs a row signal (Low), an address signal (1/5), and a precharge signal to the memory 105, to precharge bank (1), row (5).

Next, the memory I/F unit 104 decodes subcommand A22, and outputs a control signal group for writing data to bank (0), row (4), column (4, 5, 6), to the memory 105. In detail, in time T14, the memory I/F unit 104 outputs a row signal (Low) and an address signal (0/4) to the memory 105, to set a row address of an access area to bank (0), row (4). In time T16, the memory I/F unit 104 outputs a column signal (Low) and an address signal (0/4) to the memory 105, to set a column address of the access area to bank (0), column (4). The memory I/F unit 104 also outputs a write signal (Low) to the memory 105, to start writing of data. In times T16 to T18, the memory I/F unit 104 outputs data (N, O, P) to the memory 105, to write the data beginning with bank (0), row (4), column (4) in sequence. In time T18, the memory I/F unit 104 outputs a row signal (Low), an address signal (0/4), and a precharge signal to the memory 105, to precharge bank (0), row (4).

Next, the memory I/F unit 104 decodes subcommand B1, and outputs a control signal group for writing data to bank (1), row (3), column (3), to the memory 105. In detail, in time T17, the memory I/F unit 104 outputs a row signal (Low) and an address signal (1/3) to the memory 105, to set a row address of an access area to bank (1), row (3). In time T19, the memory I/F unit 104 outputs a column signal (Low) and an address signal (1/3) to the memory 105, to set a column address of the access area to bank (1), column (3). The memory I/F unit 104 also outputs a write signal (Low) to the memory 105, to start writing of data. In time T19, the memory I/F unit 104 outputs data (Q) to the memory 105, to write the data to bank (1), row (3), column (3). In time T18, the memory I/F unit 104 outputs a row signal (Low), an address signal (1/3), and a precharge signal to the memory 105, to precharge bank (1), row (3).

The following describes advantages of the command output control apparatus 100 in this embodiment, through comparison with a timing chart of a conventional command output control apparatus 100.

Figure 12:
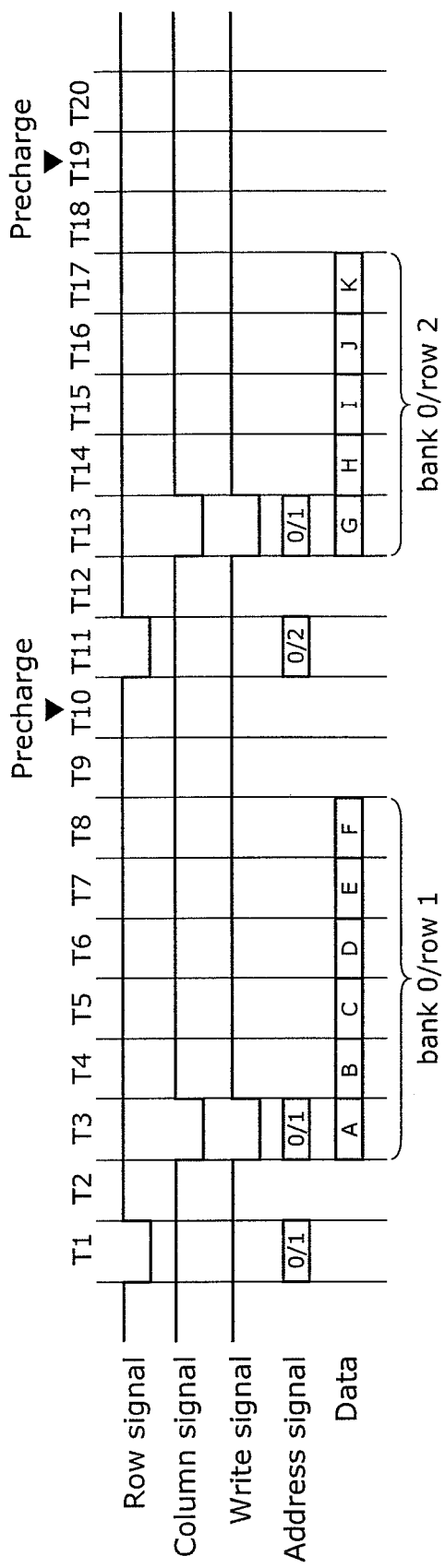
FIG. 12 shows a timing chart of signals outputted to a memory from a conventional command output control apparatus with which the command output control apparatus in the first embodiment of the present invention is compared.
Figure 13:
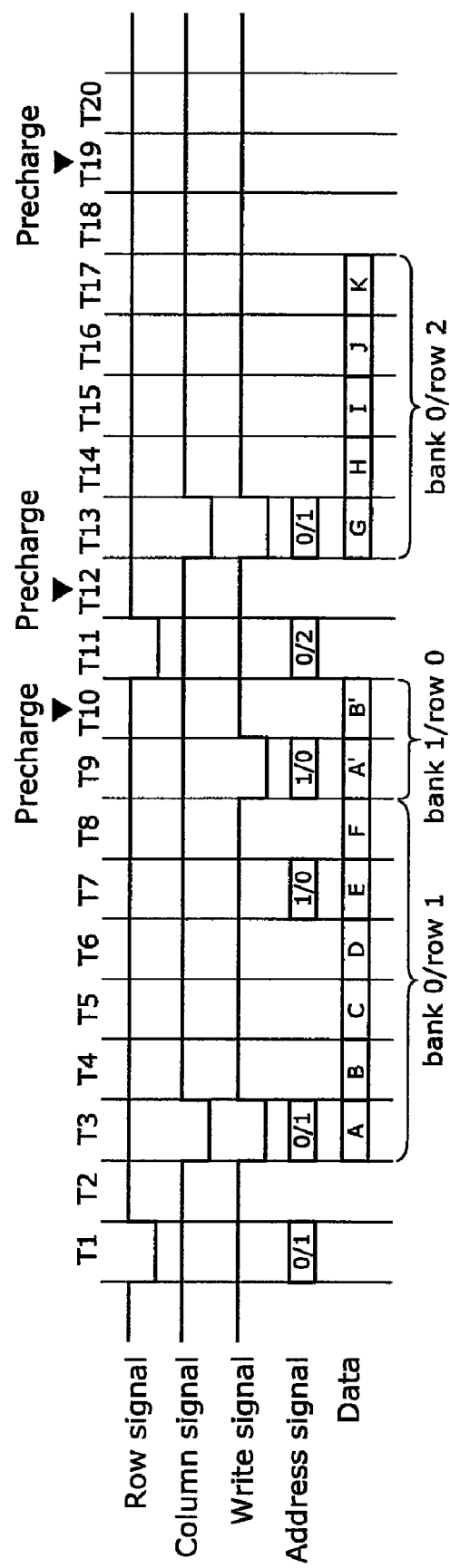
FIG. 13 shows a timing chart of signals outputted to the memory from the conventional command output control apparatus with which the command output control apparatus in the first embodiment of the present invention is compared.
Figure 14:
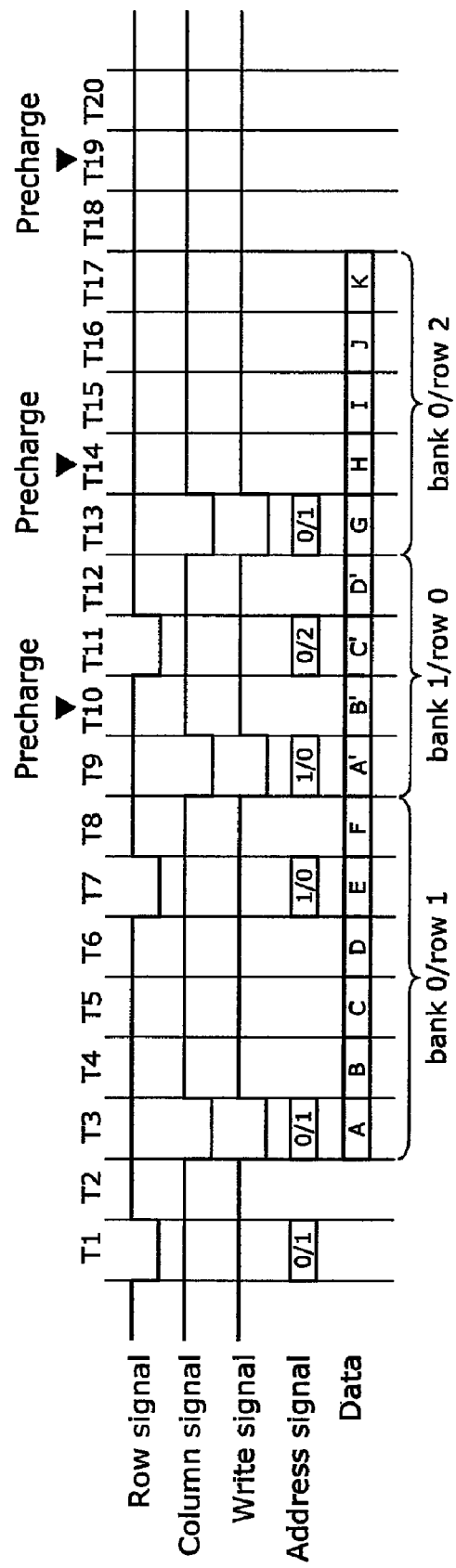
FIG. 14 shows a timing chart of signals outputted to the memory from the conventional command output control apparatus with which the command output control apparatus in the first embodiment of the present invention is compared.

FIGS. 12 to 14 show a timing chart of signals outputted to the memory 105 from the conventional command output control apparatus 100 with which the command output control apparatus 100 in this embodiment is compared.

For example, consider the case of accessing different row addresses in a same bank. In the conventional command output control apparatus, overhead appears without being concealed when there is no access to a different bank in times T9 to T12 (for example, see FIG. 12). Even if access to the different bank is performed in times T9 to T10, overhead appears without being concealed when there is no access in times T11 to T12 (for example, see FIG. 13). Meanwhile, when access to the different bank is performed in times T9 to T12, overhead does not appear as it is successfully concealed (for example, see FIG. 14).

This is because a different row address in a same bank cannot be accessed until after precharge is performed.

On the other hand, in the command output control apparatus 100 in this embodiment, access can be performed by dividing an access area, so that overhead can be concealed by inserting access to a different bank in a period during which the overhead occurs.

As described above, according to the command output control apparatus 100 in this embodiment, commands including a plurality of row addresses can be processed, and therefore efficient access can be performed even when data mapped on a memory is accessed in units of rectangular areas. In addition, when dividing an area to be accessed by a command into a plurality of partial areas, an access area smaller than the threshold is not subjected to the division. Hence it is possible to prevent the situation where a size of a partial area becomes too small to conceal overhead. It is also possible to prevent the situation where the generation of a subcommand for accessing a partial area of a small size causes overhead. Furthermore, power consumption of an address bus can be lowered without a decrease in access efficiency.

Second Embodiment

A second embodiment of the present invention is described below, with reference to drawings.

A command output control apparatus in this embodiment has the following features (d) to (g).

(d) The command output control apparatus further includes a subcommand type detection function that detects subcommands of a same type that have no dependency with a subcommand of another type, from subcommands held in the subcommand holding function, wherein the subcommand output function consecutively outputs the subcommands of the same type detected by the subcommand type detection function.

(e) The command output control apparatus further includes a write subcommand dependency detection function that detects write subcommands for accessing a same partial storage area, from subcommands held in the subcommand holding function, wherein the subcommand output function discards a write subcommand that is in an earlier position in an output order of the write subcommands and outputs a write subcommand that is in a later position in the output order of the write subcommands, according to a result of the detection by the write subcommand dependency detection function.

(f) The command output control apparatus further includes a read subcommand dependency detection function that detects read subcommands for accessing a same partial storage area, from subcommands held in the subcommand holding function, wherein the subcommand output function outputs a read subcommand that is in an earlier position in an output order of the read subcommands and discards a read subcommand that is in a later position in the output order of the read subcommands, according to a result of the detection by the read subcommand dependency detection function.

(g) The command output control apparatus further includes a buffer 215 that temporarily holds data read from the memory, wherein the subcommand output function temporarily stores, in the buffer, data read from the memory when the read subcommand that is in the earlier position in the output order is outputted, and reads the data from the buffer at an output timing of the read subcommand that is in the later position in the output order.

In view of the above, the command output control apparatus in this embodiment is described below. Note that components which are the same as those in the first embodiment have been given the same reference numerals, and their explanation has been omitted. In the following description, a subcommand for writing data to a partial storage area is referred to as a write subcommand, and a subcommand for reading data from a partial storage area is referred to as a read subcommand.

The following describes a structure of the command output control apparatus in this embodiment.

Figure 15:
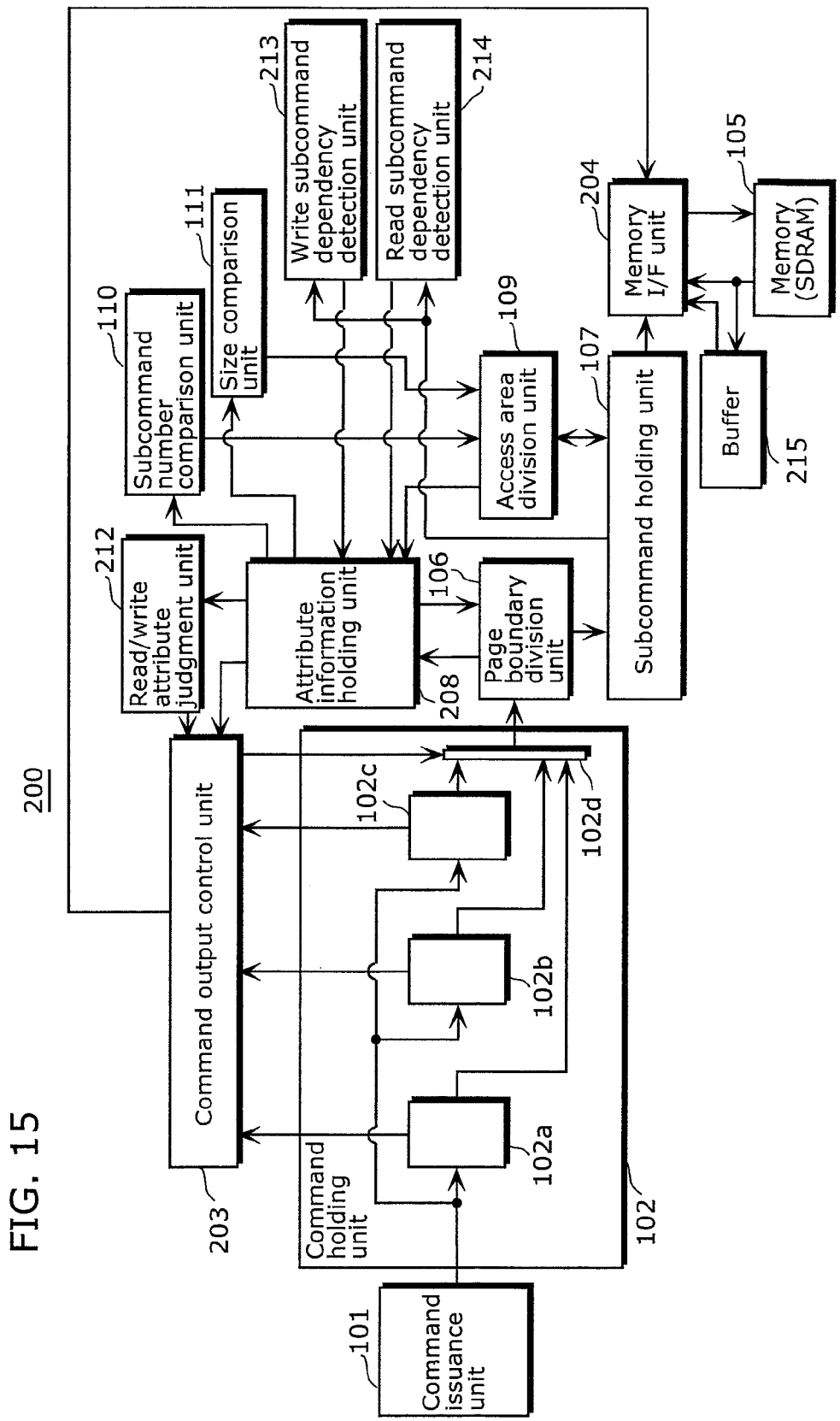
FIG. 15 shows a structure of a command output control apparatus in a second embodiment of the present invention.

FIG. 15 shows the structure of the command output control apparatus in this embodiment. As shown in FIG. 15, a command output control apparatus 200 differs from the command output control apparatus 100 in the first embodiment in the following points (1) to (8).

(1) A command output control unit 203 is included instead of the command output control unit 103.

For example, suppose a read subcommand group for accessing a same access area is held in the subcommand holding unit 107, as a result of detection by a read subcommand dependency detection unit 214. In this case, the command output control unit 203 controls a memory I/F unit 204 to output a subcommand that is in an earlier position in an output order of the read subcommand group and discard a subcommand that is in a later position in the output order of the read subcommand group. Data read from the memory 105 when outputting the subcommand that is in the earlier position in the output order of the read subcommand group is temporarily held in a buffer 215. At an output timing of the subcommand that is in the later position in the output order of the read subcommand group, this data is read from the buffer 215.

Moreover, suppose a write subcommand group for accessing a same access area is held in the subcommand holding unit 107, as a result of detection by a write subcommand dependency detection unit 213. In this case, the command output control unit 203 controls the memory I/F unit 204 to discard a subcommand that is in an earlier position in an output order of the write subcommand group and output a subcommand that is in a later position in the output order of the write subcommand group.

Furthermore, the command output control unit 203 controls the memory I/F unit 204 to consecutively output subcommands of a same type detected by a read/write attribute judgment unit 212.

(2) The memory I/F unit 204 is included instead of the memory I/F unit 104.

The memory I/F unit 204 outputs the read subcommand that is in the earlier position in the output order of the read subcommand group held in the subcommand holding unit 107, and discards the read subcommand that is in the later position in the output order of the read subcommand group, in accordance with a control signal from the command output control unit 203. The memory I/F unit 204 temporarily stores data read from the memory 105 when outputting the read subcommand that is in the earlier position in the output order of the read subcommand group, in the buffer 215. The memory I/F unit 204 reads the data from the buffer 215, at an output timing of the read subcommand that is in the later position in the output order of the read subcommand group.

The memory I/F unit 204 also discards the write subcommand that is in the earlier position in the output order of the write subcommand group, and outputs the write subcommand that is in the later position in the output order of the write subcommand group, in accordance with a control signal from the command output control unit 203.

(3) An attribute information holding unit 208 is included instead of the attribute information holding unit 108.

The attribute information holding unit 208 holds attribute information that includes, in addition to the contents of the attribute information in the first embodiment, the following contents (a) and (b) as one example.

(a) A record that associates each command with a subcommand group generated from the command such as "command (access area), subcommand (access area) {overlap flag}, subcommand (access area) {overlap flag}, . . . " is registered.

(b) An overlap flag can be set for each subcommand. Here, an initial value of the overlap flag is 0.

(4) The read/write attribute judgment unit 212 is newly included.

The read/write attribute judgment unit 212 detects subcommands of a same type that have no dependency with a subcommand of another type, from subcommands held in the subcommand holding unit 107.

(5) The write subcommand dependency detection unit 213 is newly included.

The write subcommand dependency detection unit 213 detects a write subcommand group for accessing a same access area, from subcommands held in the subcommand holding unit 107.

(6) The read subcommand dependency detection unit 214 is newly included.

The read subcommand dependency detection unit 214 detects a read subcommand group for accessing a same access area, from subcommands held in the subcommand holding unit 107.

(7) The buffer 215 is newly included.

The buffer 215 is provided between the memory 105 and the memory I/F unit 204, and temporarily holds data read from the memory 105.

(8) The size judgment unit 112 and the address comparison unit 113 are omitted.

The following describes a process in which an output order is changed by the command output control apparatus 200 in this embodiment.

Figure 16A:
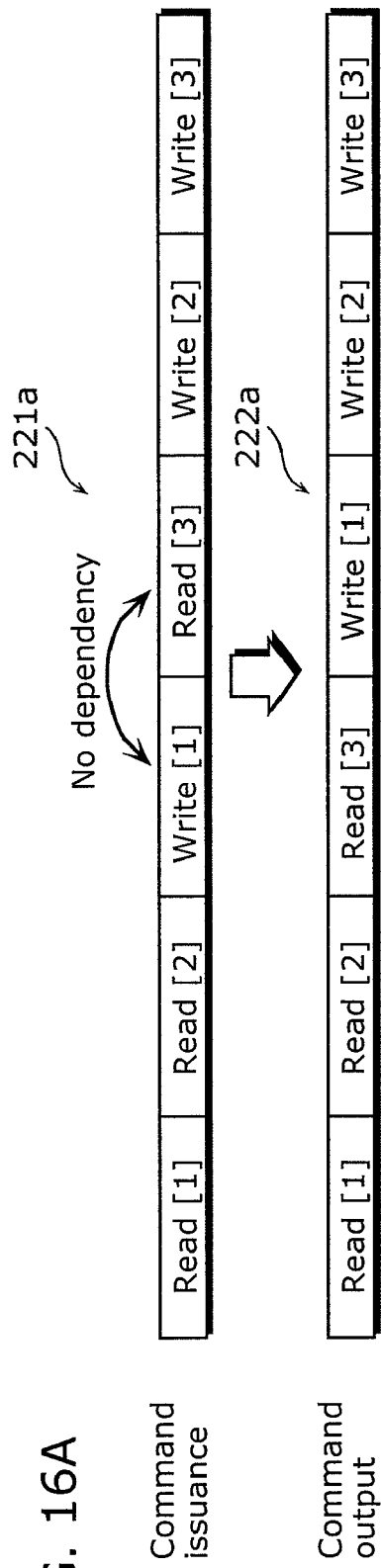
FIG. 16A is a first diagram showing an example of changing an output order by the command output control apparatus in the second embodiment of the present invention.
Figure 16B:
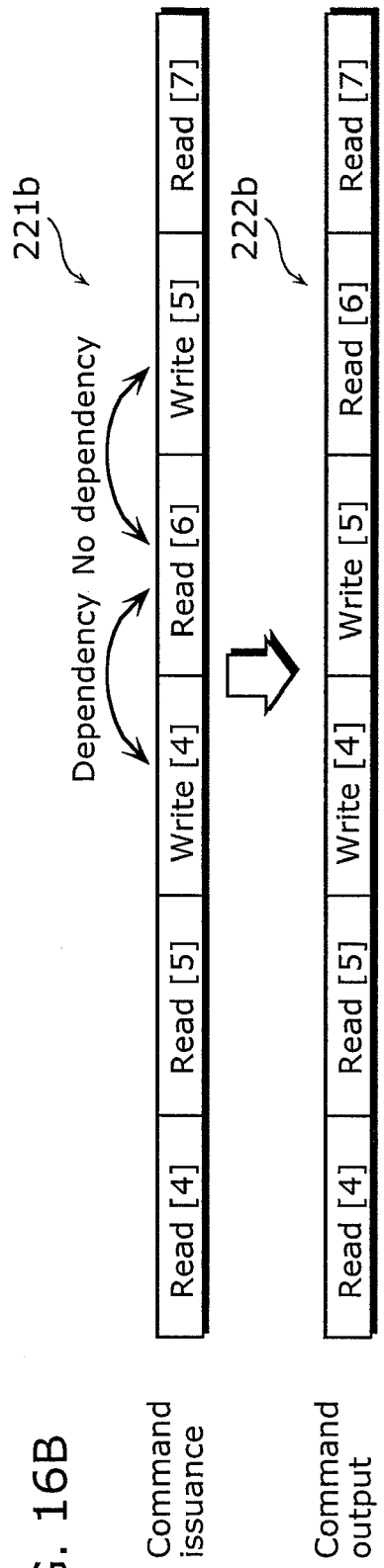
FIG. 16B is a second diagram showing an example of changing an output order by the command output control apparatus in the second embodiment of the present invention.

FIGS. 16A and 16B show an example of changing an output order by the command output control apparatus 200 in this embodiment. Consider the case where a command group 221a is issued from the command issuance unit 101 in an order of read [1], read [2], write [1], read [3], write [2], write [3], as shown in FIG. 16A. It is assumed here that an access area of write [1] and an access area of read [3] do not overlap each other, and so there is no dependency between write [1] and read [3]. When the command group 221a is outputted to the memory 105 in the order of issuance, overhead occurs between read [2] and write [1], between write [1] and read [3], and between read [3] and write [2].

In view of this, the command output control unit 203 changes the ordinal positions of write [1] and read [3] in the command group 221a, according to a result of judgment by the read/write attribute judgment unit 212. Suppose the command group 221a whose order has been changed, that is, a command group 222a, is outputted to the memory 105 in the order of output. That is, read [1], read [2], read [3], write [1], write [2], and write [3] are outputted in this order. In such a case, overhead occurs between read [3] and write [1].

In this example, there are three instances where overhead occurs, when the command group is outputted to the memory 105 in the order of issuance without changing the ordinal positions. On the other hand, there is only one instance where overhead occurs, when the command group is changed in ordinal position and outputted to the memory 105 in the order of output. Thus, the number of instances where overhead occurs can be reduced by 2, by changing the ordinal positions.

Likewise, consider the case where a command group 221b is issued from the command issuance unit 101 in an order of read [4], read [5], write [4], read [6], write [5], read [7], as shown in FIG. 16B. It is assumed here that an access area of write [4] and an access area of read [6] overlap each other and so there is a dependency between write [4] and read [6]. It is also assumed that the access area of read [6] and an access area of write [5] do not overlap each other and so there is no dependency between read [6] and write [5]. When the command group 221b is outputted to the memory in the order of issuance, overhead occurs between read [5] and write [4], between write [4] and read [6], between read [6] and write [5], and between write [5] and read [7].

In view of this, the command output control unit 203 changes the ordinal positions of read [6] and write [5] in the command group 221b, according to a result of judgment by the read/write attribute judgment unit 212. Suppose the command group 221b whose order has been changed, that is, a command group 222b, is outputted to the memory 105 in the order of output. That is, read [4], read [5], write [4], write [5], read [6], and read [7] are outputted in this order. In this case, overhead occurs between read [5] and write [4], and between write [5] and read [6].

In this example, there are four instances where overhead occurs, when the command group is outputted to the memory 105 in the order of issuance without changing the ordinal positions. On the other hand, there are two instances where overhead occurs, when the command group is changed in ordinal position and outputted to the memory 105 in the order of output. Thus, the number of instances where overhead occurs can be reduced by 2, by changing the ordinal positions.

The following describes a process in which a dependency is detected by the write subcommand dependency detection unit 213 in this embodiment.

FIG. 17 shows a process in which a dependency is detected by the write subcommand dependency detection unit 213 in this embodiment. As shown in FIG. 17, the write subcommand dependency detection unit 213 references attribute information, and searches subcommands registered in the attribute information for subcommands that overlap in access area. Upon detecting overlapping subcommands, the write subcommand dependency detection unit 213 updates the attribute information by setting an overlap flag of a subcommand that is in an earlier position in an output order of the detected subcommands, to 1.

For example, suppose a command of write [1] shown in FIG. 16A is a write command (hereafter referred to as a write command (A3)) for writing data to access area A3, and access area A3 is divided into access areas A31, A32, A33, and A34 and a write subcommand (A31), a write subcommand (A32), a write subcommand (A33), and a write subcommand (A34) are generated. This being the case, "write command (A3), write subcommand (A31) {0}, write subcommand (A32) {0}, write subcommand (A33) {0}, write subcommand (A34) {0}" is registered in attribute information 231.

Moreover, suppose a command of write [3] shown in FIG. 16A is a write command (hereafter referred to as a write command (A4)) for writing data to access area A4, and access area A4 is divided into access areas A41 and A33 and a write subcommand (A41) and a write subcommand (A33) are generated. This being the case, "write command (A4), write subcommand (A41) {0}, write subcommand (A33) {0}" is registered in the attribute information 231.

The write subcommand dependency detection unit 213 detects the write subcommand (A33) associated with the write command (A3) and the write subcommand (A33) associated with the write command (A4), as overlapping subcommands. The write subcommand dependency detection unit 213 accordingly sets an overlap flag of the write subcommand (A33) associated with the write command (A3) that is in an earlier position in an output order of the detected subcommands to 1, as shown in attribute information 232.

The following describes a process in which a dependency is detected by the read subcommand dependency detection unit 214 in this embodiment.

Figure 18:
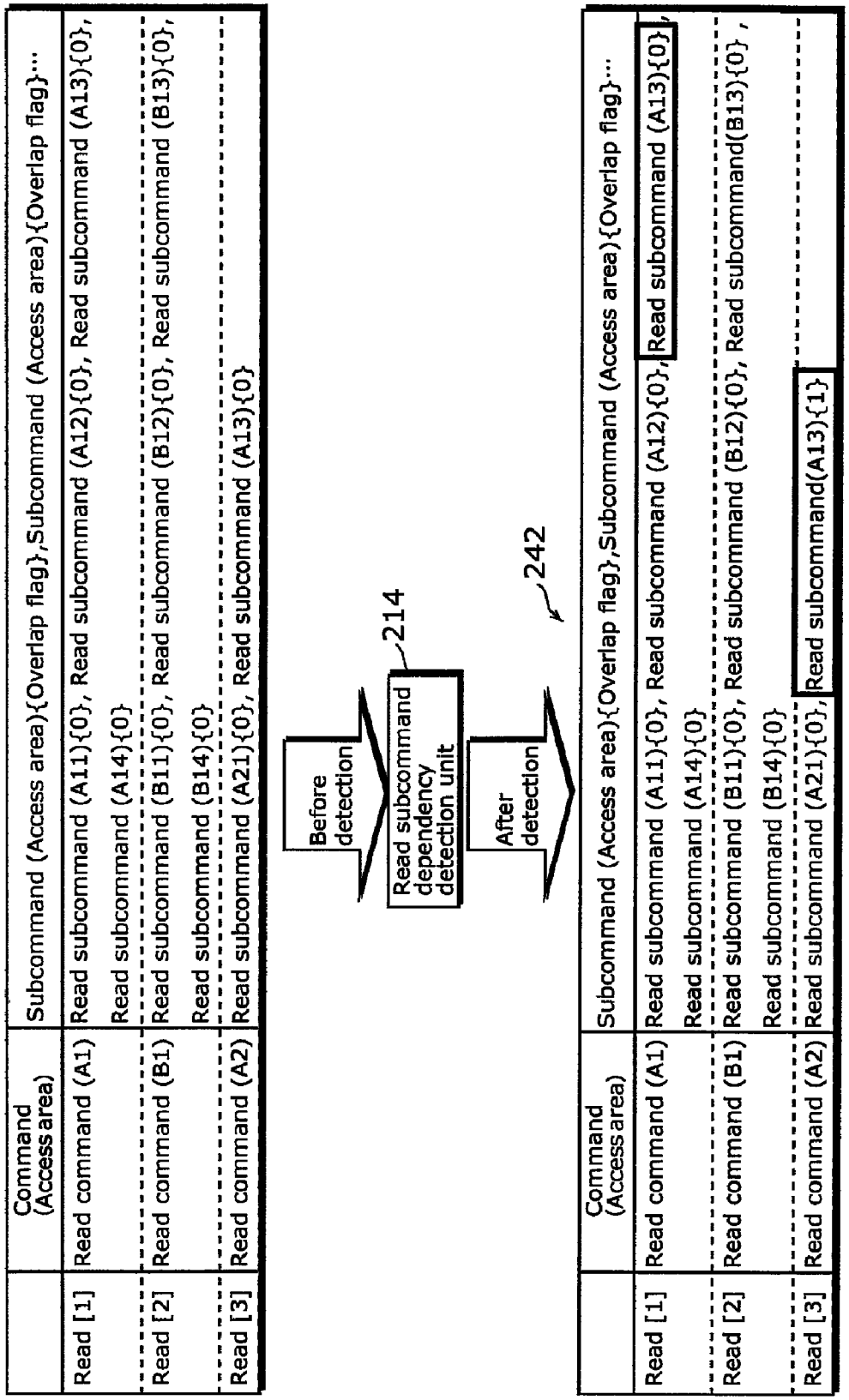
FIG. 18 shows a process in which a dependency is detected by a read subcommand dependency detection unit in the second embodiment of the present invention.

FIG. 18 shows a process in which a dependency is detected by the read subcommand dependency detection unit 214 in this embodiment. As shown in FIG. 18, the read subcommand dependency detection unit 214 references attribute information, and searches subcommands registered in the attribute information for subcommands that overlap in access area. Upon detecting overlapping subcommands, the read subcommand dependency detection unit 214 updates the attribute information by setting an overlap flag of a subcommand that is in a later position in an output order of the detected subcommands, to 1.

For example, suppose a command of read [1] shown in FIG. 16A is a read command (hereafter referred to as a read command (A1)) for reading data from access area A1, and access area A1 is divided into access areas A11, A12, A13, and A14 and a read subcommand (A11), a read subcommand (A12), a read subcommand (A13), and a read subcommand (A14) are generated. This being the case, "read command (A1), read subcommand (A11) {0}, read subcommand (A12) {0}, read subcommand (A13) {0}, read subcommand (A14) {0}" is registered in attribute information 241.

Moreover, suppose a command of read [3] shown in FIG. 16A is a read command (hereafter referred to as read command (A2)) for reading data from access area A2, and access area A2 is divided into access areas A21 and A13 and a read subcommand (A21) and a read subcommand (A13) are generated. This being the case, "read command (A2), read subcommand (A21) {0}, read subcommand (A13) {0}" is registered in the attribute information 241.

The read subcommand dependency detection unit 214 detects the read subcommand (A13) associated with the read command (A1) and the read subcommand (A13) associated with the read command (A2), as overlapping subcommands. The read subcommand dependency detection unit 214 accordingly sets an overlap flag of the read subcommand (A13) associated with the read command (A2) that is in a later position in an output order of the detected subcommands to 1, as shown in attribute information 242.

The following describes an operation of the command output control apparatus 200 in this embodiment.

Figure 19:
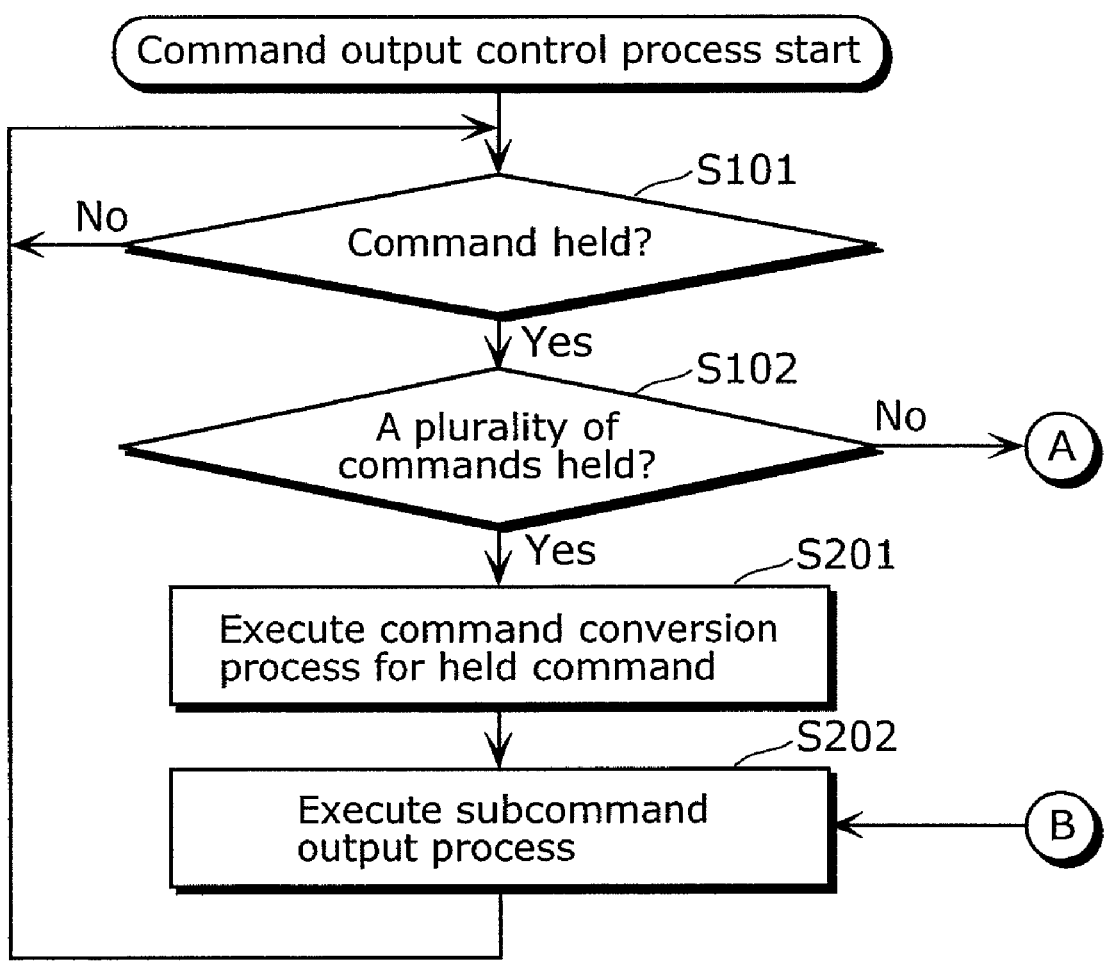
FIG. 19 is a first diagram showing a command output control process performed in the command output control apparatus in the second embodiment of the present invention.
Figure 20:
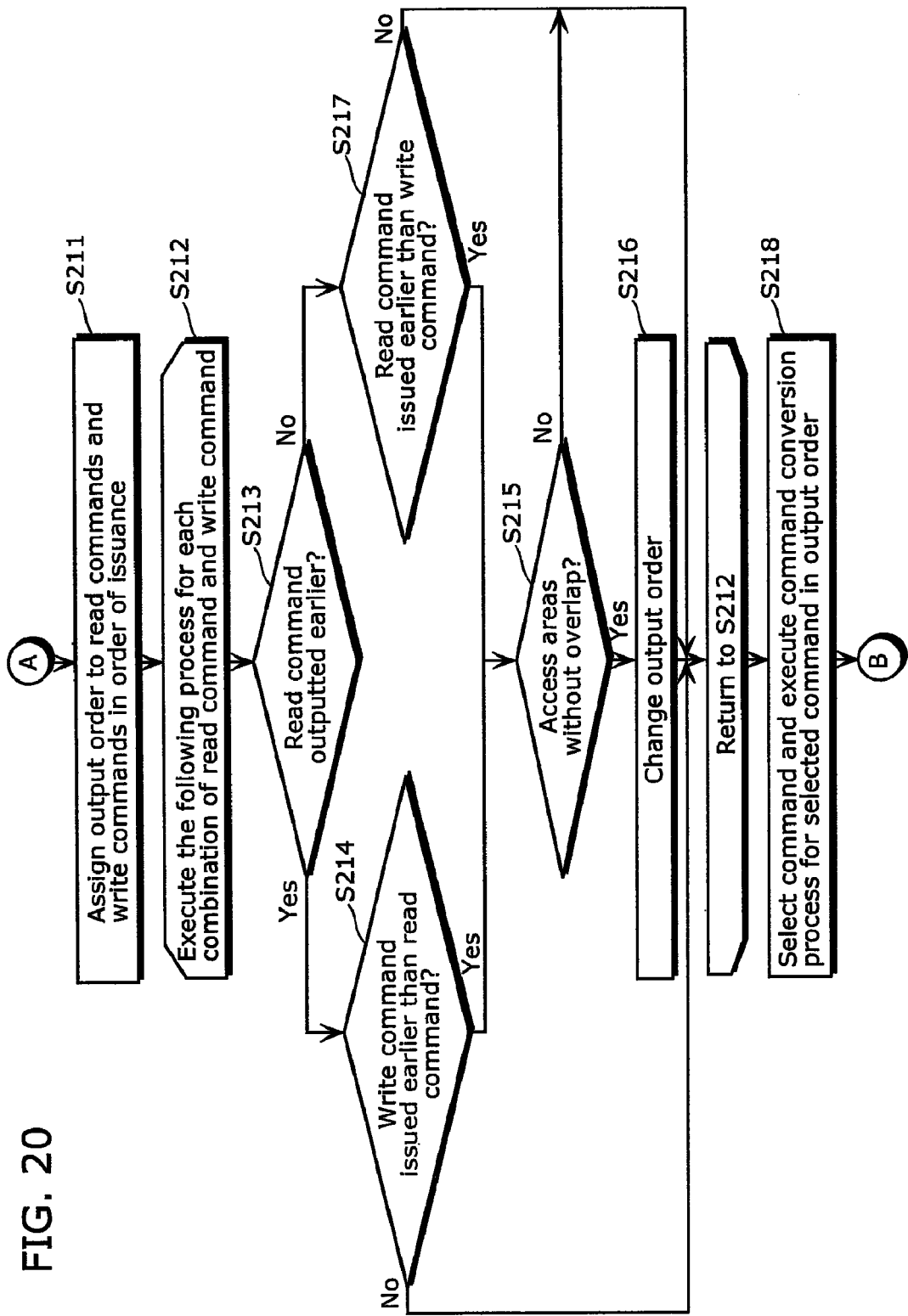
FIG. 20 is a second diagram showing the command output control process performed in the command output control apparatus in the second embodiment of the present invention.

FIGS. 19 and 20 show a command output control process performed in the command output control apparatus 200 in this embodiment. As shown in FIGS. 19 and 20, the command output control apparatus 200 performs the following command output control process (Steps S101, S102, S201 to S218). Step S101 is the same as Step S101 in the command output control process (for example, see FIG. 6) in the first embodiment, and so its explanation has been omitted here.

(Step S102) The command output control unit 203 judges whether or not a plurality of commands are held in the command holding unit 102. As a result of the judgment, when a plurality of commands are held (Step S102: Yes), the command output control unit 203 performs Step S201 described below. When a plurality of commands are not held (Step S102: No), the command output control unit 203 performs Step S211 described below.

(Step S201) The command output control unit 203 selects a command from the plurality of commands held in the command holding unit 102, and controls the command holding unit 102 to output the selected command. The command output control unit 203 causes a command conversion process (for example, see FIG. 21) to be performed on the outputted command. Here, the command output control unit 203 may perform the selection in the order of issuance, or may record a type of a command outputted earlier and select the same type of command as the earlier outputted command with priority. The command output control unit 203 then performs Step S202 described below.

(Step S202) The command output control unit 203 controls the memory I/F unit 204 to perform a subcommand output process (for example, see FIG. 24) on a subcommand group. As a result, a subcommand included in the subcommand group is outputted from the memory I/F unit 204 to the memory 105. The command output control unit 203 then performs Step S101 again.

(Step S211) The command output control unit 203 assigns an output order to read commands and write commands in the order of issuance. The command output control unit 203 then performs Step S212 described below.

(Step S212) The command output control unit 203 performs Steps S213 to S217 described below, for every combination of a read command and a write command. Having performed Steps S213 to S217 for every combination, the command output control unit 203 performs Step S218 described below.

(Step S213) The command output control unit 203 judges whether or not the read command is outputted to the page boundary division unit 106 earlier. As a result of the judgment, when the read command is outputted earlier (Step S213: Yes), the command output control unit 203 performs Step S214 described below. When the read command is not outputted earlier (Step S213: No), the command output control unit 203 performs Step S217 described below.

(Step S214) The command output control unit 203 judges whether or not the write command is issued from the command issuance unit 101 earlier than the read command. As a result of the judgment, when the write command is issued earlier (Step S214: Yes), the command output control unit 203 performs Step S215 described below. When the write command is issued later (Step S214: No), the command output control unit 203 performs above Step S212 again.

(Step S215) The command output control unit 203 judges whether or not access areas of the write command and the read command do not overlap each other. As a result of the judgment, when the access areas do not overlap each other (Step S215: Yes), the command output control unit 203 performs Step S216 described below. When the access areas overlap each other (Step S215: No), the command output control unit 203 performs above Step S212 again.

(Step S216) The command output control unit 203 changes positions of the read command and the write command in the output order. The command output control unit 203 then performs Step S212 again.

(Step S217) The command output control unit 203 judges whether or not the read command is issued from the command issuance unit 101 earlier than the write command. As a result of the judgment, when the read command is issued earlier (Step S217: Yes), the command output control unit 203 performs above Step S215. When the read command is issued later (Step S217: No), the command output control unit 203 performs above Step S212 again.

(Step S218) The command output control unit 203 selects a command according to the output order, and controls the command holding unit 102 to output the selected command. The command output control unit 203 then causes the command conversion process (for example, see FIG. 21) to be performed on the outputted command. After this, the command output control unit 203 performs above Step S202.

Figure 21:
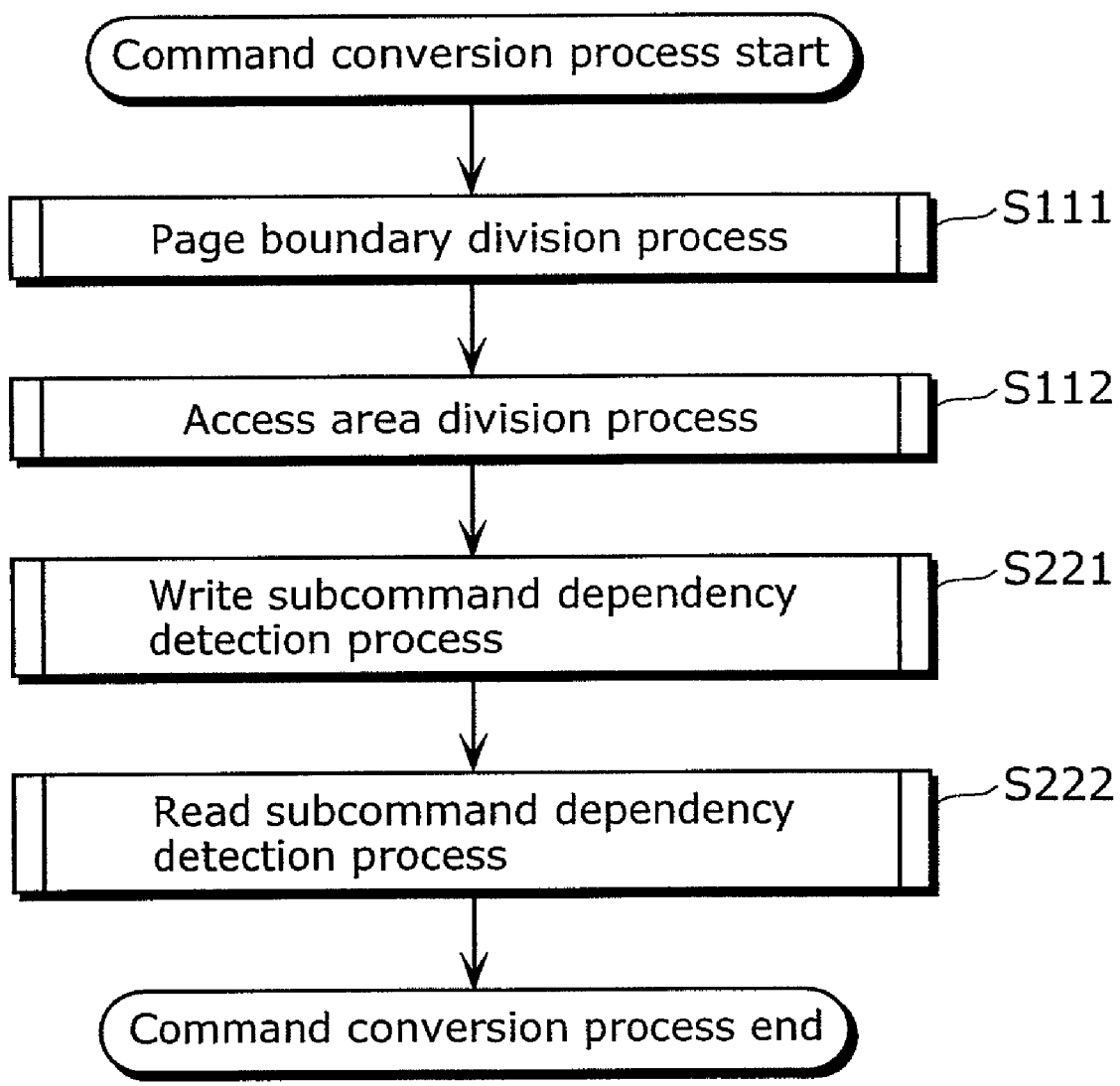
FIG. 21 shows a command conversion process performed in the command output control apparatus in the second embodiment of the present invention.

FIG. 21 shows the command conversion process performed in the command output control apparatus 200 in this embodiment. As shown in FIG. 21, the command output control apparatus 200 performs the following command conversion process (Steps S111, S112, S221, and S222). Note that Steps S111 and S112 are the same as Steps S111 and S112 in the command conversion process (for example, see FIG. 7) in the first embodiment, and so their explanation has been omitted here.

(Step S221) The write subcommand dependency detection unit 213 performs a write subcommand dependency detection process (for example, see FIG. 22) on subcommands held in the subcommand holding unit 107, to detect overlapping write subcommands.

(Step S222) The read subcommand dependency detection unit 214 performs a read subcommand dependency detection process (for example, see FIG. 23) on the subcommands held in the subcommand holding unit 107, to detect overlapping read subcommands.

Figure 22:
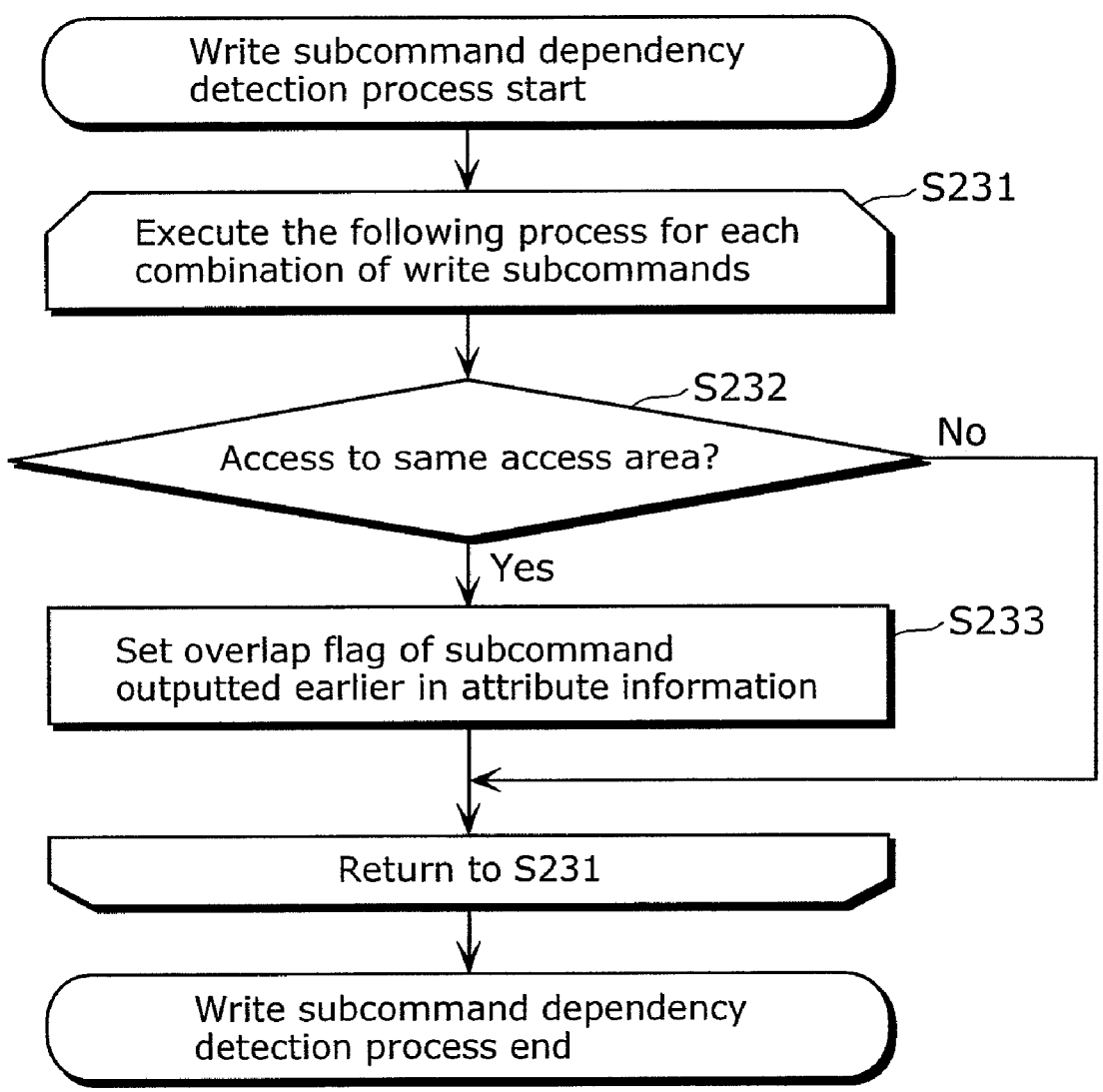
FIG. 22 shows a write subcommand dependency detection process performed in the command output control apparatus in the second embodiment of the present invention.

FIG. 22 shows the write subcommand dependency detection process performed in the command output control apparatus 200 in this embodiment. As shown in FIG. 22, the command output control apparatus 200 performs the following write subcommand dependency detection process (Steps S231 to S233).

(Step S231) The write subcommand dependency detection unit 213 performs Steps S232 and S233 described below, for every combination of write subcommands. Having performed Steps S232 and S233 for each combination, the write subcommand dependency detection unit 213 ends the write subcommand dependency detection process.

(Step S232) The write subcommand dependency detection unit 213 judges whether or not the combination of write subcommands access a same access area. As a result of the judgment, when the combination of write subcommands access the same access area (Step S232: Yes), the write subcommand dependency detection unit 213 performs Step S233 described below. When the combination of write subcommands do not access the same access area (Step S232: No), the write subcommand dependency detection unit 213 performs Step S231 for the next combination.

(Step S233) The write subcommand dependency detection unit 213 sets, in attribute information held in the attribute information holding unit 208, an overlap flag of a write subcommand that is in an earlier position in an output order of the write subcommand group for accessing the same access area, to 1.

Figure 23:
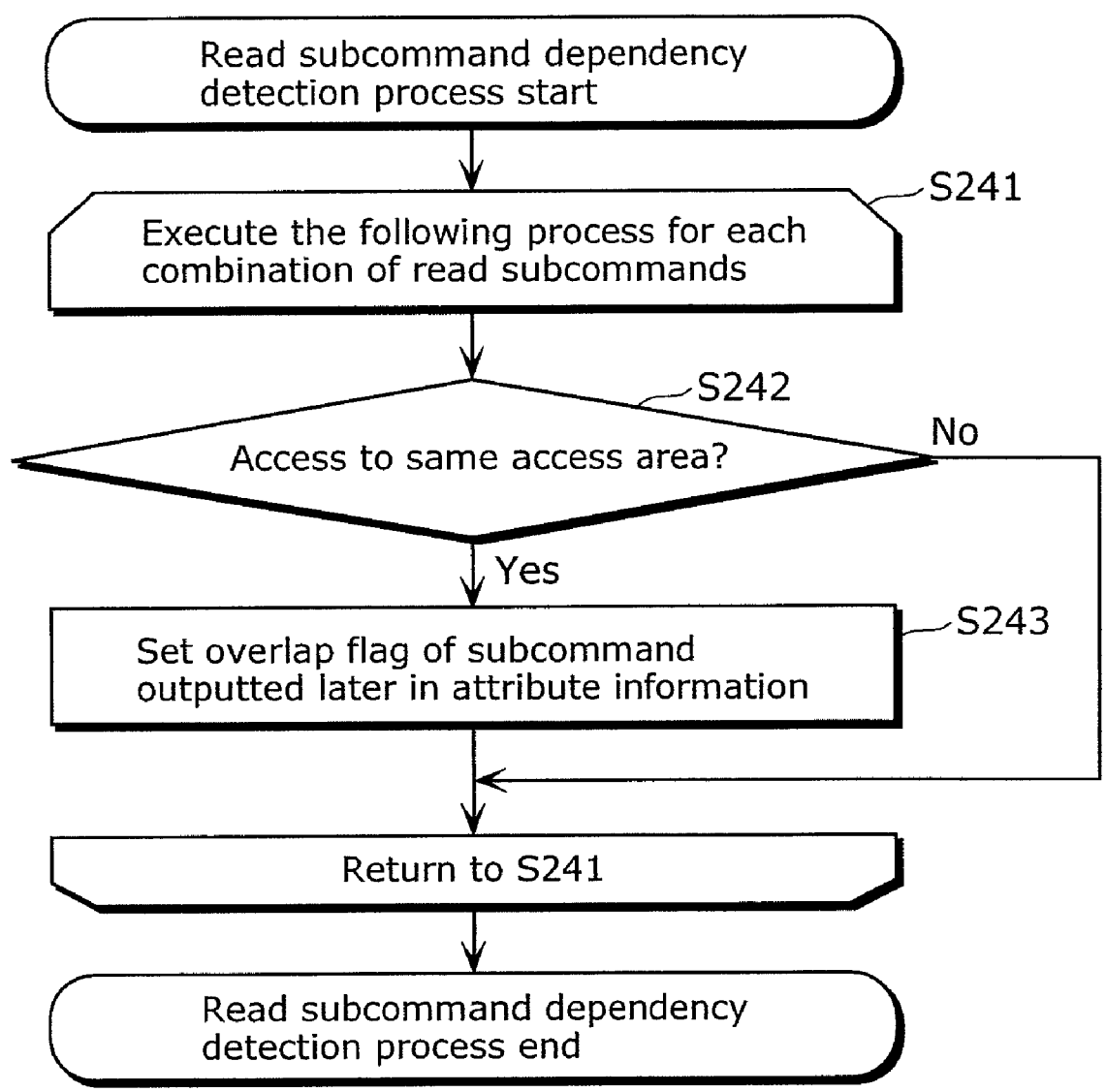
FIG. 23 shows a read subcommand dependency detection process performed in the command output control apparatus in the second embodiment of the present invention.

FIG. 23 shows the read subcommand dependency detection process performed in the command output control apparatus 200 in this embodiment. As shown in FIG. 23, the command output control apparatus 200 performs the following read subcommand dependency detection process (Steps S241 to S243).

(Step S241) The read subcommand dependency detection unit 214 performs Steps S242 and S243 described below, for every combination of read subcommands. Having performed Steps S242 and S243 for every combination, the read subcommand dependency detection unit 214 ends the read subcommand dependency detection process.

(Step S242) The read subcommand dependency detection unit 214 judges whether or not the combination of read subcommands access a same access area. As a result of the judgment, when the combination of read subcommands access the same access area (Step S242: Yes), the read subcommand dependency detection unit 214 performs Step S243 described below. When the combination of read subcommands do not access the same access area (Step S242: No), the read subcommand dependency detection unit 214 performs Step S241 for the next combination.

(Step S243) The read subcommand dependency detection unit 214 sets, in attribute information held in the attribute information holding unit 208, an overlap flag of a read subcommand that is in a later position in an output order of the read subcommand group for accessing the same access area, to 1.

FIG. 24 shows the subcommand output process performed in the command output control apparatus 200 in this embodiment. As shown in FIG. 24, the command output control apparatus 200 performs the following subcommand output process (Steps S251 to S259, S145). Note that Step S145 is the same as Step S145 in the subcommand output process (for example, see FIG. 10) in the first embodiment, and so its explanation has been omitted here.

(Step S251) The command output control unit 203 selects a subcommand from a subcommand group that is subjected to output. The command output control unit 203 then performs Step S252 described below.

(Step S252) The command output control unit 203 judges whether or not the selected subcommand is a read subcommand, according to a result of judgment by the read/write attribute judgment unit 212. As a result of the judgment, when the selected subcommand is a read subcommand (Step S252: Yes), the command output control unit 203 performs Step S253 described below. When the selected subcommand is not a read subcommand (Step S252: No), the command output control unit 203 performs Step S256 described below. Here, the read/write attribute judgment unit 212 references attribute information held in the attribute information holding unit 208, specifies a type of the subcommand selected by the command output control unit 203, and outputs information about the specified type to the command output control unit 203.

(Step S253) The command output control unit 203 references the attribute information held in the attribute information holding unit 208, and judges whether or not an overlap flag of the selected subcommand is set to 0. As a result of the judgment, when the overlap flag is set to 0 (Step S253: Yes), the command output control unit 203 controls the memory I/F unit 204 to perform Step S254 described below. When the overlap flag is set to 1 (Step S253: No), the command output control unit 203 controls the memory I/F unit 204 to perform Step S255 described below.

(Step S254) The memory I/F unit 204 extracts the subcommand selected by the command output control unit 203, from the subcommand holding unit 107. The memory I/F unit 204 outputs the extracted subcommand to the memory 105, to read data from an access area specified by the outputted subcommand. The memory I/F unit 204 then ends the subcommand output process.

(Step S255) The memory I/F unit 204 extracts the subcommand selected by the command output control unit 203, from the subcommand holding unit 107. The memory I/F unit 204 discards the extracted subcommand without outputting it to the memory 105. The memory I/F unit 204 reads data which has been read from an access area specified by the discarded subcommand and stored in the buffer 215 beforehand, from the buffer 215. The memory I/F unit 204 then ends the subcommand output process.

(Step S256) The command output control unit 203 judges whether or not the selected subcommand is a write subcommand, according to a result of judgment by the read/write attribute judgment unit 212. As a result of the judgment, when the selected subcommand is a write subcommand (Step S256: Yes), the command output control unit 203 performs Step S257 described below. When the selected subcommand is not a write subcommand (Step S256: No), the command output control unit 203 performs Step S145. Here, the read/write attribute judgment unit 212 references the attribute information held in the attribute information holding unit 208, specifies a type of the subcommand selected by the command output control unit 203, and outputs information about the specified type to the command output control unit 203.

(Step S257) The command output control unit 203 references the attribute information held in the attribute information holding unit 208, and judges whether or not an overlap flag of the selected subcommand is set to 0. As a result of the judgment, when the overlap flag is set to 0 (Step S257: Yes), the command output control unit 203 controls the memory I/F unit 204 to perform Step S258 described below. When the overlap flag is set to 1 (Step S257: No), the command output control unit 203 controls the memory I/F unit 204 to perform Step S259 described below.

(Step S258) The memory I/F unit 204 extracts the subcommand selected by the command output control unit 203, from the subcommand holding unit 107. The memory I/F unit 204 outputs the extracted subcommand to the memory 105, to write data to an access area specified by the outputted subcommand. The memory I/F unit 204 then ends the subcommand output process.

(Step S259) The memory I/F unit 204 extracts the subcommand selected by the command output control unit 203, from the subcommand holding unit 107. The memory I/F unit 204 discards the extracted subcommand without outputting it to the memory 105. The memory I/F unit 204 then ends the subcommand output process.

As described above, according to the command output control apparatus 200 in this embodiment, the possibility that overhead occurs between a read command and a write command can be reduced. In addition, an overlapping write command can be omitted, with it being possible to improve access efficiency. Furthermore, an overlapping read command can be omitted, with it being possible to improve access efficiency.

Other Variations

Note that the command output control apparatus may also be realized by an LSI that includes each function of the command output control apparatus.

The LSI may be realized by a full-custom Large Scale Integration (LSI), a semi-custom LSI such as an Application Specific Integrated Circuit (ASIC), a programmable logic device such as a Field Programmable Gate Array (FPGA) or a Complex Programmable Logic Device (CPLD), or a dynamic reconfigurable device that enables a circuit structure to be changed dynamically.

Moreover, design data for implementing each function of the command output control apparatus on the LSI may be a program (hereafter referred to as an HDL program) written in a hardware description language. The design data may also be a gate-level netlist obtained by logical synthesis of the HDL program. The design data may also be macro cell information in which placement information, process conditions, and the like are added to the gate-level netlist. The design data may also be mask data specifying dimensions, timings, and the like. Examples of the hardware description language include Very high speed integrated circuit Hardware Description Language (VHDL), Verilog-HDL, SystemC, and the like.

Moreover, the design data may be recorded on a recording medium that is readable by a hardware system such as a computer system or an embedded system. The design data may also be read and executed on another hardware system via the recording medium. The design data read on another hardware system via the recording medium may be downloaded to a programmable logic device via a download cable. Examples of the recording medium readable on a computer system include an optical recording medium (for example, a CD-ROM), a magnetic recording medium (for example, a hard disk), a magneto-optical recording medium (for example, an MO), and a semiconductor memory (for example, a memory card).

The design data may also be held in a hardware system connected to a network such as an internet, a local area network, or the like. The design data may also be downloaded and executed on another hardware system via the network. The design data acquired on another hardware system via the network may be downloaded to a programmable logic device via a download cable. Examples of the network include a terrestrial broadcasting network, a satellite broadcasting network, Power Line Communication (PLC), a mobile telephone network, a wired communication network (for example, IEEE 802.3), and a wireless communication network (for example, IEEE 802.11).

The design data may also be recorded on a serial ROM so as to be transferred to an FPGA upon activation. The design data recorded on the serial ROM may be directly downloaded to the FPGA upon activation.

Alternatively, the design data may be generated by a microprocessor and downloaded to the FPGA upon activation.

INDUSTRIAL APPLICABILITY

The present invention can be used as a command output control apparatus and the like that control output of commands for controlling a memory, and especially as a command output control apparatus and the like that control output of commands used for read/write.

The invention claimed is:

1. A command output control apparatus, comprising:
a subcommand holder that holds a first subcommand group and a second subcommand group, the first subcommand group being generated from a command for accessing a first storage area, and the second subcommand group being generated from a command for accessing a second storage area included in a bank different from a bank in which the first storage area is included;
a number comparer that compares a number of subcommands included in the first subcommand group and a number of subcommands included in the second subcommand group;
a storage area selector, that selects, according to a result of a comparison by said number comparer, a selected storage area, from the first storage area and the second storage area, that corresponds to a smaller number of subcommands, and that is subjected to division;
a size comparer that compares sizes of partial storage areas to be accessed by subcommands included in a subcommand group having the smaller number of subcommands;
a partial storage area selector that selects, from the partial storage areas, according to a result of a comparison by said size comparer, a partial storage area having at least a predetermined size as a selected partial storage area that is subjected to the division, the partial storage areas being included in the selected storage area that is subjected to the division;
a subcommand generator that generates subcommands for accessing new partial storage areas obtained by dividing the selected partial storage area that is subjected to the division;
a subcommand replacer that replaces a subcommand for accessing the selected partial storage area that is subjected to the division among subcommands held in said subcommand holder, with the subcommands being generated by said subcommand generator; and
a subcommand outputter that alternately outputs subcommands from the first subcommand group and the second subcommand group, to a memory.

2. The command output control apparatus according to claim 1, further comprising:
a size specifier that specifies sizes of partial storage areas to be accessed by subcommands,
wherein said subcommand outputter outputs from, among the subcommands held in said subcommand holder, a subcommand for accessing a partial storage area smaller than the predetermined size subsequent to a subcommand for accessing the partial storage area having at least the predetermined size, according to a result of a specification by said size specifier.

3. The command output control apparatus according to claim 1, further comprising:
a subcommand type detector that detects subcommands of a same type that do not have a dependency relationship with a subcommand of another type, from the subcommands held in said subcommand holder,
wherein said subcommand outputter consecutively ouputs the subcommands of the same type detected by said subcommand type detector.

4. The command output control apparatus according to claim 1, further comprising:
a write subcommand dependency detector that detects write subcommands for accessing a same partial storage area, from the subcommands held in said subcommand holder,
wherein said subcommand outputter discards a write subcommand that is in an earlier position in an output order of the write subcommands and outputs a write subcommand that is in a later position in the output order of the write subcommands, according to a result of a detection by said write subcommand dependency detector.

5. The command output control apparatus according to claim 1, further comprising:
- a read subcommand dependency detector that detects read subcommands for accessing a same partial storage area, from the subcommands held in said subcommand holder,
- wherein said subcommand outputter outputs a read subcommand that is in an earlier position in an output order of the read subcommands and discards a read subcommand that is in a later position in the output order of the read subcommands, according to a result of a detection by said read subcommand dependency detector.

6. The command output control apparatus according to claim 5, further comprising:
- a buffer that temporarily holds data read from the memory,
- wherein said subcommand outputter temporarily stores, in said buffer, the data read from the memory when the read subcommand that is in the earlier position in the output order is output, and reads the data held in said buffer when outputting the read subcommand that is in the later position in the output order.

7. The command output control apparatus according to claim 1, further comprising:
- an address comparer that compares addresses of partial storage areas to be accessed by the subcommands in each of the first and second subcommand groups; and
- a subcommand selector that selects, from the subcommands held in said subcommand holder, a subcommand for accessing a partial storage area that has a smaller displacement from an address of a partial storage area accessed by a subcommand output earlier, according to a result of a comparison by said address comparer,
- wherein said subcommand outputter outputs the subcommand selected by said subcommand selector.

8. A command output control method for controlling a command output control apparatus that includes a subcommand holder that holds a first subcommand group and a second subcommand group, the first subcommand group being generated from a command for accessing a first storage area, and the second subcommand group being generated from a command for accessing a second storage area included in a bank different from a bank in which the first storage area is included, comprising:
- comparing a number of subcommands included in the first subcommand group and a number of subcommands included in the second subcommand group;
- selecting, according to a result of the comparing, a selected storage area, of the first storage area and the second storage area, that corresponds to the smaller number of subcommands, and that is subjected to division;
- comparing sizes of partial storage areas to be accessed by subcommands included in a subcommand group having the smaller number of subcommands;
- selecting, according to a result of the comparing the sizes of the partial storage areas, a partial storage area having at least a predetermined size as a selected partial storage area that is subjected to the division, the partial storage areas being included in the selected storage area that is subjected to the division;
- generating subcommands for accessing new partial storage areas obtained by dividing the selected partial storage area that is subjected to the division;
- replacing a subcommand for accessing the selected partial storage area that is subjected to the division among subcommands held in the subcommand holder, with the subcommands generated in said generating; and
- alternately outputting subcommands from the first subcommand group and the second subcommand group, to a memory.

* * * * *